US012609720B2

(12) United States Patent
Towne et al.

(10) Patent No.: US 12,609,720 B2
(45) Date of Patent: Apr. 21, 2026

(54) INTEGRATED REMOTE RADIO HEAD AND ANTENNA MODULE ASSEMBLY

(71) Applicant: COMMUNICATION COMPONENTS ANTENNA INC., Kanata (CA)

(72) Inventors: Gerald Towne, Salem, NH (US); Jaron Peters, Danville, NH (US); Vinay Vij, Kanagawa (JP)

(73) Assignee: COMMUNICATION COMPONENTS ANTENNA INC., Kanata (CA)

( * ) Notice: Subject to any disclaimer, the term of this patent is extended or adjusted under 35 U.S.C. 154(b) by 128 days.

(21) Appl. No.: 18/471,287

(22) Filed: Sep. 20, 2023

(65) Prior Publication Data

US 2024/0146342 A1     May 2, 2024

Related U.S. Application Data

(63) Continuation-in-part of application No. 17/978,881, filed on Nov. 1, 2022, now abandoned.

(51) Int. Cl.
| | |
|---|---|
| *H01Q 1/12* | (2006.01) |
| *H04B 1/03* | (2006.01) |
| *H04B 1/08* | (2006.01) |
| *H01Q 1/24* | (2006.01) |

(52) U.S. Cl.
CPC ................ *H04B 1/03* (2013.01); *H04B 1/08* (2013.01); *H01Q 1/1228* (2013.01); *H01Q 1/246* (2013.01)

(58) Field of Classification Search
CPC .......... H01Q 1/24; H01Q 1/243; H01Q 1/246; H01Q 1/1228; H04B 1/03; H04B 1/06
See application file for complete search history.

(56) References Cited

U.S. PATENT DOCUMENTS

| | | | |
|---|---|---|---|
| 9,660,328 B2 | 5/2017 | Wild | |
| 9,692,115 B2 | 6/2017 | Rucki et al. | |
| 10,122,083 B2 | 11/2018 | Kim et al. | |
| 10,476,127 B2 | 11/2019 | Kim et al. | |
| 2015/0009177 A1 | 1/2015 | Yamamoto | |
| 2017/0149115 A1* | 5/2017 | Sierzenga | H01Q 1/246 |
| 2022/0344798 A1* | 10/2022 | Park | H01Q 1/125 |

FOREIGN PATENT DOCUMENTS

KR          102376170          5/2016

* cited by examiner

*Primary Examiner* — Hoang V Nguyen
(74) *Attorney, Agent, or Firm* — Sofer & Haroun, LLP

(57) ABSTRACT

A remote radio head assembly attaches a remote radio head to the back wall of an antenna unit. The remote radio head assembly has a radio bracket attached to the top of the radio head having a handle for lifting and carrying the radio head. Radio guide spacers attached to the back side of the remote radio head are for sliding the remote radio head along a mounting rail attachment disposed on the back wall of the antenna unit. The mounting rail has a pivot hook for receiving an installation lever configured to engage with the handle to move the remote radio head in downward and upward directions so as to couple the connector ports of the antenna unit.

16 Claims, 26 Drawing Sheets

INTEGRATED REMOTE RADIO HEAD AND ANTENNA MODULE ASSEMBLY

RELATED APPLICATION

This application is a continuation-in-part of pending U.S. patent application Ser. No. 17/978,881, filed on Nov. 1, 2022, the entirety of which is incorporated by reference.

FIELD OF THE INVENTION

The present invention relates to an assembly for releasably attaching a remote radio head (RRH) to an antenna module of a base station on a telecommunication tower such as a cellular telephone antenna tower.

BACKGROUND

Within the past few years antenna manufacturers have developed a new approach in placing cellular remote radio heads (RRH) as close as possible to the antenna units of the cell towers. In a few arrangements, the RRH units are attached to the back wall of the antenna unit to minimize the lengths of coaxial cable used to connect the radio to the antenna when they are physically separated. The signal loss over the length of the cable ultimately reduces the amount of power transmitted from the antenna and received by the antenna, reducing its effective range. Integrating the radio with the antenna optimizes the range covered by the antenna. There are also logistical reasons for installing RRH units close to the antenna modules, such as lack of available space to locate a ground-based radio in crowded urban settings, stadiums, etc.

However, because the remote radio head has a sizable dimension and weight, attaching and detaching it from the antenna module of a cell tower requires some effort by the operating technician, demanding an arrangement and design that is as safe and convenient as possible. Although there has been some effort to devise solutions for a safer and easier process for installing the RRH on the antenna module, there is still a need for an ever more convenient arrangement for releasably attaching an RRH to the antenna unit.

SUMMARY OF THE INVENTION

In accordance with various embodiments of the invention, a remote radio head (RRH) having a frame and a bracket is configured to be slidably and releasably attached to the back wall of an antenna unit of a cellular tower. A guide rail is attached to the back wall for slidably receiving the RRH. The top portion of the RRH bracket includes at least one anchor pin, that is configured to face the back wall of the antenna module when the RRH is slidably and vertically guided along the guide rail. The guide rail includes a slot for receiving an installation lever that has a fork shaped distal end to engage with the anchor pin. The bottom side of the RRH includes radio cable connectors that are configured to connect with the receiving connectors of the antenna module. Once the RRH is guided such that the cable connectors are proximally aligned with the receiving connectors of the antenna module, the operator engages the installation lever through the guide slot such that its fork like distal end engages with the anchor pin. The movement of the installation lever against the pin downwardly forces the RRH cable connectors to engage with the receiving connectors of the antenna module. Conversely, engaging the installation lever in the opposite direction allows the RRH cable connectors to easily disengage upwardly from the antenna module connectors.

In accordance with another embodiment, the RRH cable connector and the connectors of the antenna module include a blind mate arrangement to compensate for any misalignment when they are pressed towards each other. Additionally, the connectors of the antenna module include a spring mechanism so as to receive the RRH cable connectors in a spring-loaded arrangement.

To this end, and in accordance with one embodiment, the connectors in the antenna module are spring loaded. Inside this module there is also a connector stabilizing arrangement, to ensure the connectors stay perpendicular to radio connector face. Furthermore, an alignment cover is provided, that supports the spring and ensures that the spring is applying the force in the correct direction. The spring-loaded connectors in the antenna module are preloaded to ensure the integrity of the radio frequency signal path. The spring-loaded connectors have other benefits in that tolerances can be overcome with a connector that has flexibility in axial and radial directions moving up and down. It also maintains a force on the radio connectors to maintain a robust RF connection through vibration and shock loads on the unit.

BRIEF DESCRIPTION OF THE DRAWINGS

In accordance with various embodiments.

DETAILED DESCRIPTION OF VARIOUS EMBODIMENTS

The present disclosure may be modified in various embodiments, some of which will be described in more detail here. However, the present disclosure is not limited to the specific embodiments described here, but includes equivalents, and alternatives that are included within the scope of this disclosure. The terms used here are for the purposes of describing specific embodiments and are not intended to limit the scope of the disclosure.

Figure 1:
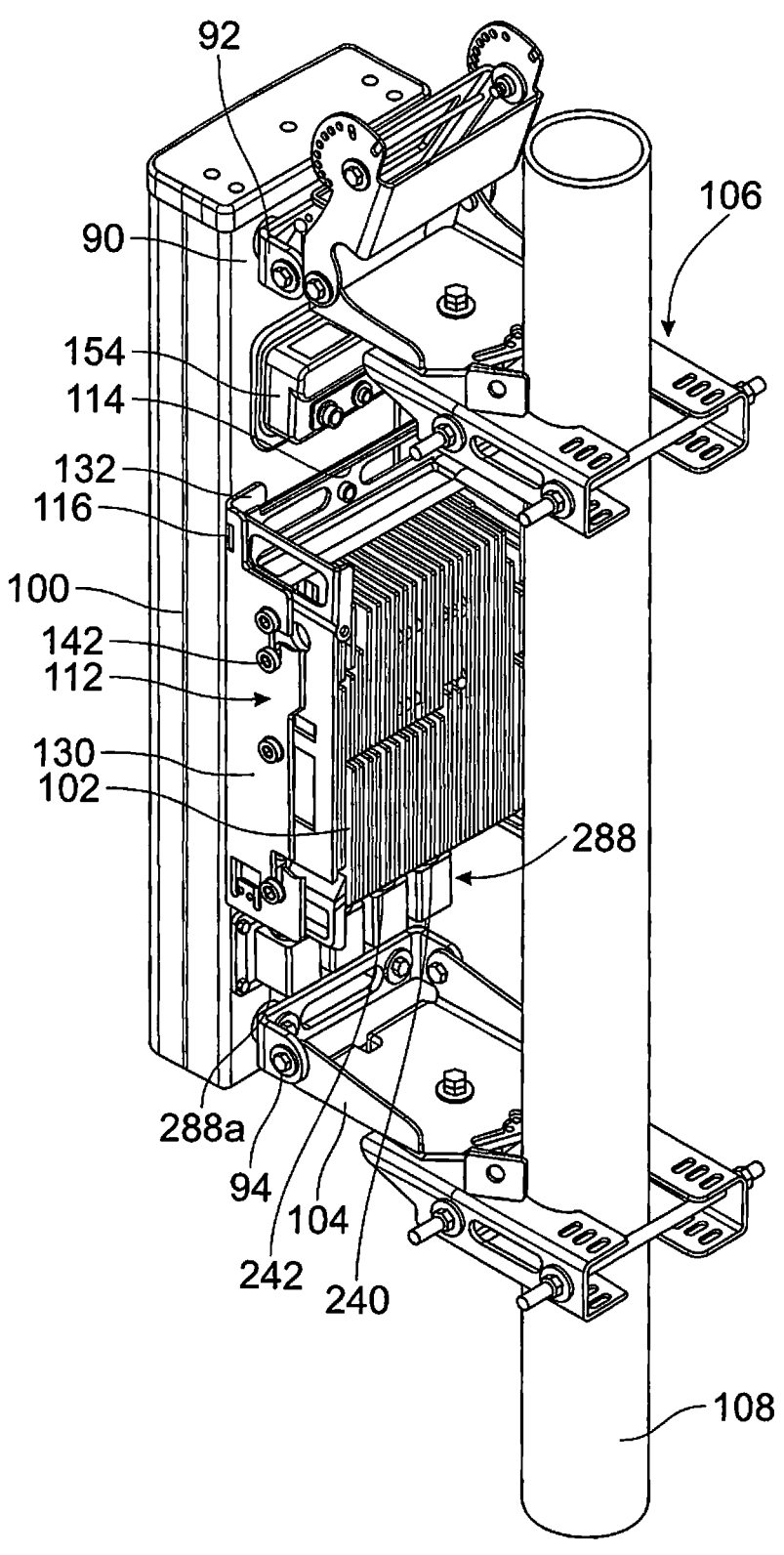
FIG. 1 illustrates a remote radio head attached to a back side of a cellular antenna unit in accordance with one embodiment.

Referring now to FIG. 1 a perspective view of an antenna module 100 is illustrated, for example, as attached to a cellular tower pole 108 via couple of commercially available fastening mechanisms 104 and 106. Antenna module 100 includes a back wall 90 that is configured to receive various brackets for securing various attachments to it. For example, an upper fastening mechanism 106 is secured to back wall 90 via a bracket 92, and lower fastening mechanism 104 is secured to back wall 90 via a bracket 94.

Back wall 90 additionally supports two guide rail modules 112 (only one shown in FIG. 1) that are configured to receive and support a remote radio head 102 as it slides downward such that connector parts 242 of remote radio head 102 are guided to and supported at their intended location proximally aligned to antenna module connector parts 240, covered and shielded by a connector housing 288.

Figures 2A, 2B:
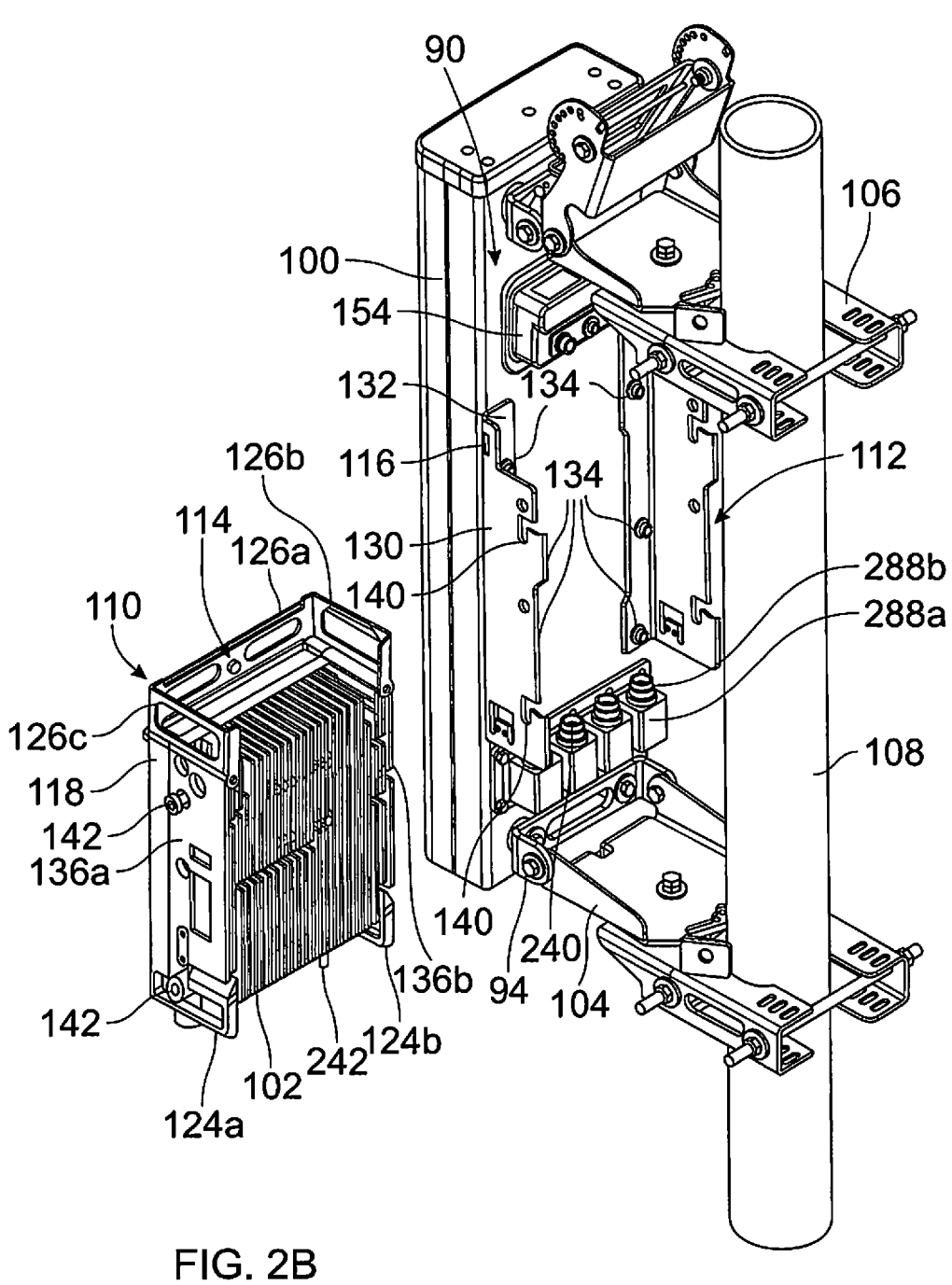
FIG. 2a illustrates the back side of a cellular antenna unit with guide rails for the remote radio head and connector housing for shielding and guiding the connectors of the antenna module attached to the back side in accordance with one embodiment.
FIG. 2b illustrates a remote radio head that is configured to be installed on the antenna module of FIG. 2a in accordance with one embodiment.

In accordance with one embodiment, as illustrated in FIG. 2*a*, each guide rail module 112 includes two panels 130 and 132 attached together in a perpendicular arrangement, panel 132 being attached to back wall 90 via screws 134, panel 130 extending outwardly from back wall 90.

As illustrated in FIGS. 1, and 2*a*, guide rail modules 112 are separated by a width approximately equal to the width of remote radio head 102. Each panel 130 includes guide slots 140 at its upper and lower portions to receive a corresponding shoulder screw 142 fastened to each side of remote radio head 102.

In accordance with one embodiment, at least one of the panels 130 includes a narrow slot 116 at its top portion for receiving an installation lever (not shown) to help an installer to forcibly slide remote radio head 102 downwardly to engage its connector parts 242 with the antenna module connector parts 240 coupled to terminals 120 (FIG. 4) of the antenna module 100, or inversely to forcibly slide remote radio head 102 upwardly to disengage its connector parts 242 from connector parts 240 in order to remove the remote radio head from the guide rail modules 112.

FIGS. 2*a* and 2*b*, also illustrate remote radio head 102 when it is not installed on the antenna module. Remote radio head 102 includes a frame module 118 attached to the back side of remote radio head 102 for securing it to antenna module 100. Frame 118 includes a top handle bracket 110 and bottom handle brackets 124*a* and 124*b*, correspondingly attached to the top portion and bottom portion of frame 118. Top handle bracket 110 includes three bracket sections 126*a*, 126*b*, 126*c*, with section 126*a* extending along the back width of frame 118 and its two remaining sections 126*b* and 126*c* extending perpendicularly away from frame 118, each having a depth approximately the same as the depth of remote radio head 102. Bottom bracket sections 124*a* and 124*b* extend perpendicularly away from the two sides of frame 118 having a depth approximately the same as the depth of remote radio head 102. The top and bottom handle brackets include appropriately placed slots for allowing convenient gripping and handling of remote radio head 102 by a technician.

Figure 2C:
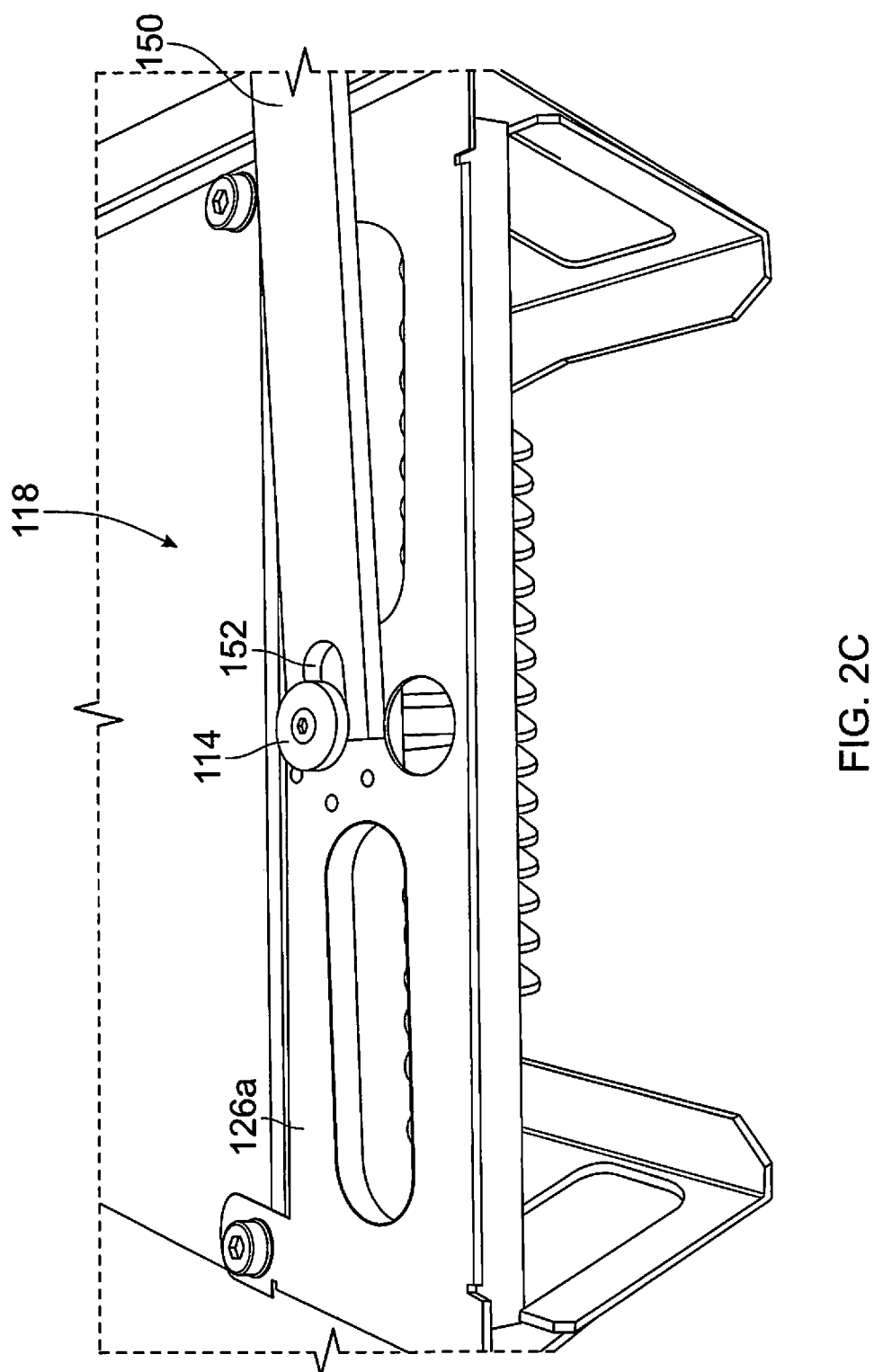
FIG. 2c illustrates a frame module attached to the remote radio head, along with an installation lever for installing and moving the frame module up and down the guide rails in accordance with one embodiment.

In accordance with one embodiment, top bracket section 126*a* includes an anchor pin 114, such as a shoulder screw that extends behind the front surface of bracket section 126*a* as illustrated in FIG. 2*c*. Anchor pin 114 is configured to get engaged with a installation lever 150 as illustrated in FIG. 2*c* and explained more fully in connection with remaining Figures later. In accordance with various embodiments, anchor pin 114 is any protrusion extending from bracket section 126*a* towards back wall 90 that is configured to be engaged with a installation lever for forcing the movement of remote radio head upward or downward depending on the direction of the installation lever force exerted on the protrusion.

As illustrated in FIG. 2*c*, installation lever 150 includes a distal end 152 that is configured, as for example as a fork shape, to engage with anchor pin 114, allowing an operator to forcibly lift remote radio head 102 as it slides up along the back of antenna module 100, or conversely allowing the operator to forcibly push down remote radio head 102 as it slides down along the back of antenna module 100.

In accordance with one embodiment, in order to securely place remote radio head 102 against guide rail module 112, panels 130*a* and 130*b* include shoulder screw guides or slots 140 at their top and bottom portions that are configured as open slots to receive corresponding shoulder screws 142. In accordance with one embodiment, guide slots 140 include a neck portion that has a diameter that is smaller than the diameter of shoulder screws 142, so that when shoulder screws 142 are slid along guide slots 140 the screw would not move beyond the neck portion without an additional exertion force. However, once a sufficient force is exerted, the neck portion opens allowing the shoulder screws to slide along the remaining portion of slot 140, allowing the shoulder screw to rest against its bottom portion.

Shoulder screws 142 are attached to the sides of remote radio head 102. In one embodiment each side of remote radio head 102 has two shoulder screws 142 at its top and bottom portions corresponding to the location of screw guides 140 so that as the remote radio head is placed against the back side of antenna module and pushed towards the back side the remote radio head is slid downwardly against the side panels 130a and 130b, the shoulder screws sliding into the opening of the screw guides or slots and first resting against its neck portion and eventually moving past the neck portion and towards the base portion of the slots when installation lever 150 exert force downwardly against the remote radio head. In accordance with one embodiment, the shoulder screws are configured to bear some weight of the remote radio head when resting against the base portions of the screw guides, as illustrated in FIG. 3a.

Figure 3A:
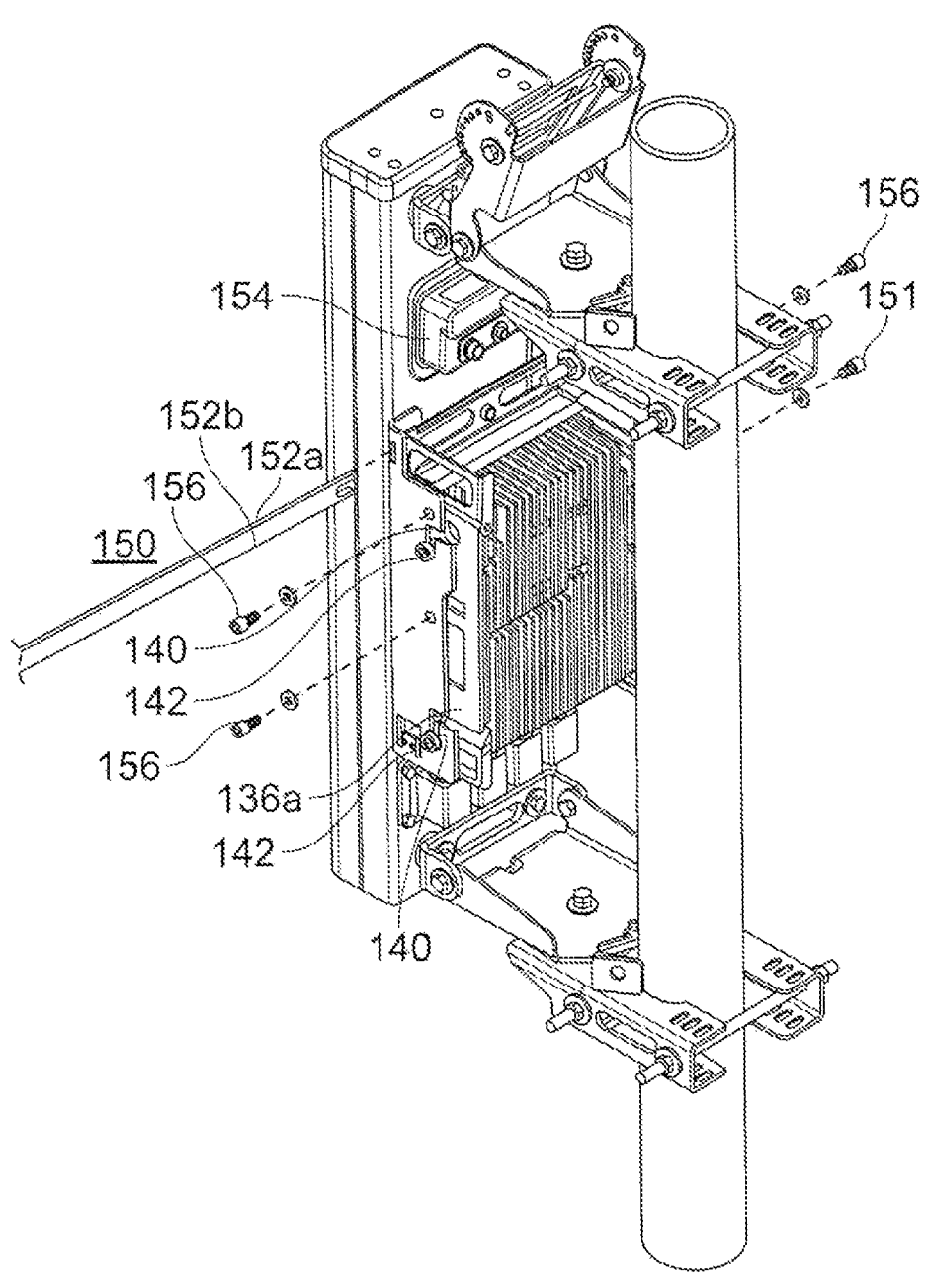
FIG. 3a illustrates a remote radio head installed on an antenna module while an installation lever arrangement is being engaged with the remote radio head to slidably move it upwardly or downwardly in accordance with one embodiment.
Figure 3B:
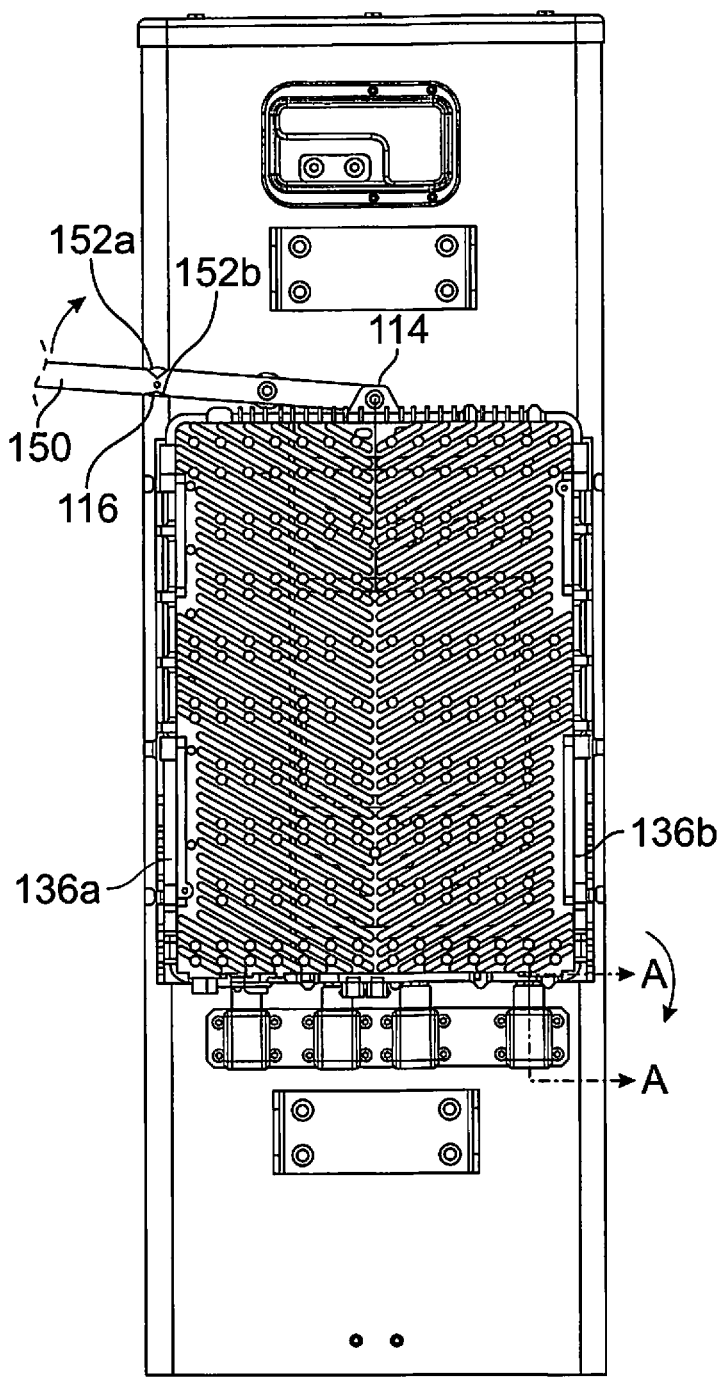
FIG. 3b illustrates the remote radio head of FIG. 3a while the installation lever arrangement is being engaged with the remote radio head to slidably move it downwards, to engage its RF connector with the antenna module RF connector in accordance with one embodiment.

As further illustrated further in FIGS. 3a and 3b, installation lever 150 includes at least an upper notch 152a, and an additional lower notch 152b, in accordance with one embodiment, located at a predefined fulcrum having a distance from the distal end of the installation lever, such that when the installation lever is slid through slot 116 of side panel 130a, when the distal end fork engages with screw 114, the notches get aligned with and positioned within slot 116, defining a pivot point for the installation lever. In accordance with another embodiment, installation lever 150 does not include notches 152a or 152b. In that situation when the installation lever is inserted within slot 116 it extends until its distal end engages screw 114, the location on the installation lever that rests against the edge of slot 116 defining the installation lever's fulcrum, with forces exerting on the proximal end of the installation lever causing it to pivot up or down at its fulcrum. Notches 152 allow the installation lever to have some degree of freedom to pivot upwardly or downwardly as the proximal end of the installation lever is moved downwardly or upwardly.

Figure 7:
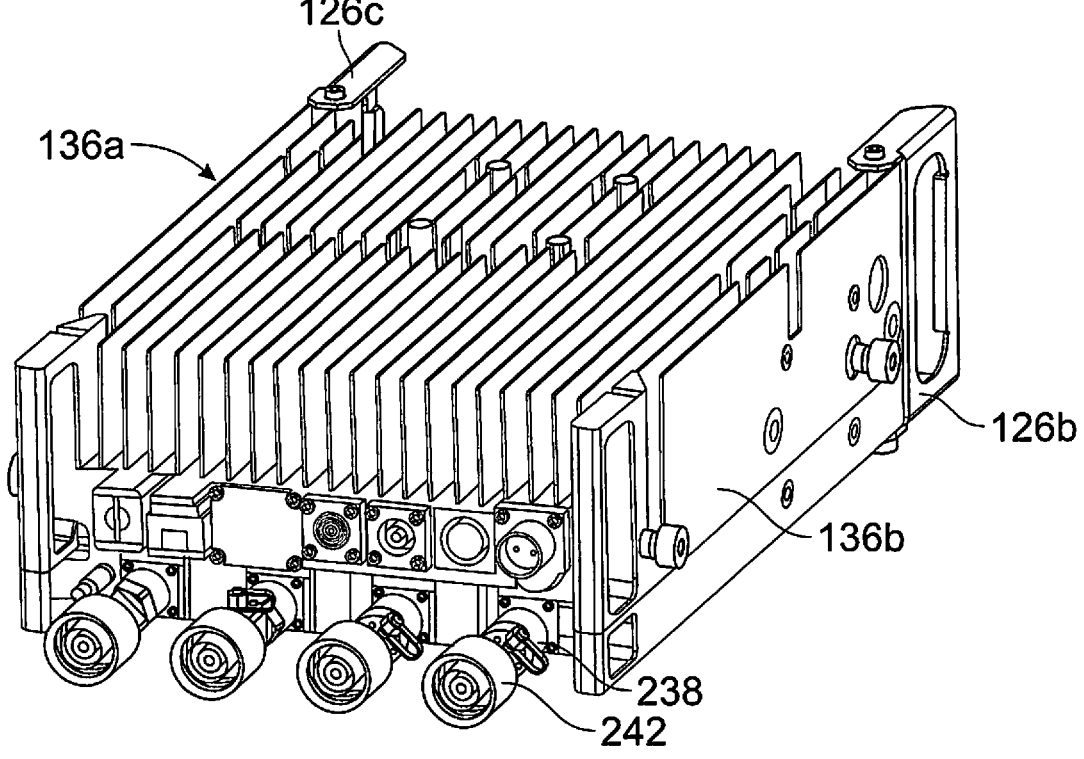
FIG. 7 illustrates a RRH connector configured to couple the input/output terminals of remote radio head to the terminals of antenna module 100 in accordance with one embodiment.

Referring back to FIG. 3a, screws 156 are configured to fixedly secure remote radio head 102 to side panels 130a and 130b once remote radio head 102 has been pushed down by installation lever 150 to fully engage the connectors of the remote radio head to the antenna module connectors of antenna module 100. Furthermore, remote radio head 102 may also include side panels 136a and 136b, that are configured to slide into panels 126c and 126b of bracket 110 at their top end. Side panels 136a and 136b are also configured to slide into brackets 124a and 124b at their bottom end, as also illustrated in FIG. 7.

Figure 3C:
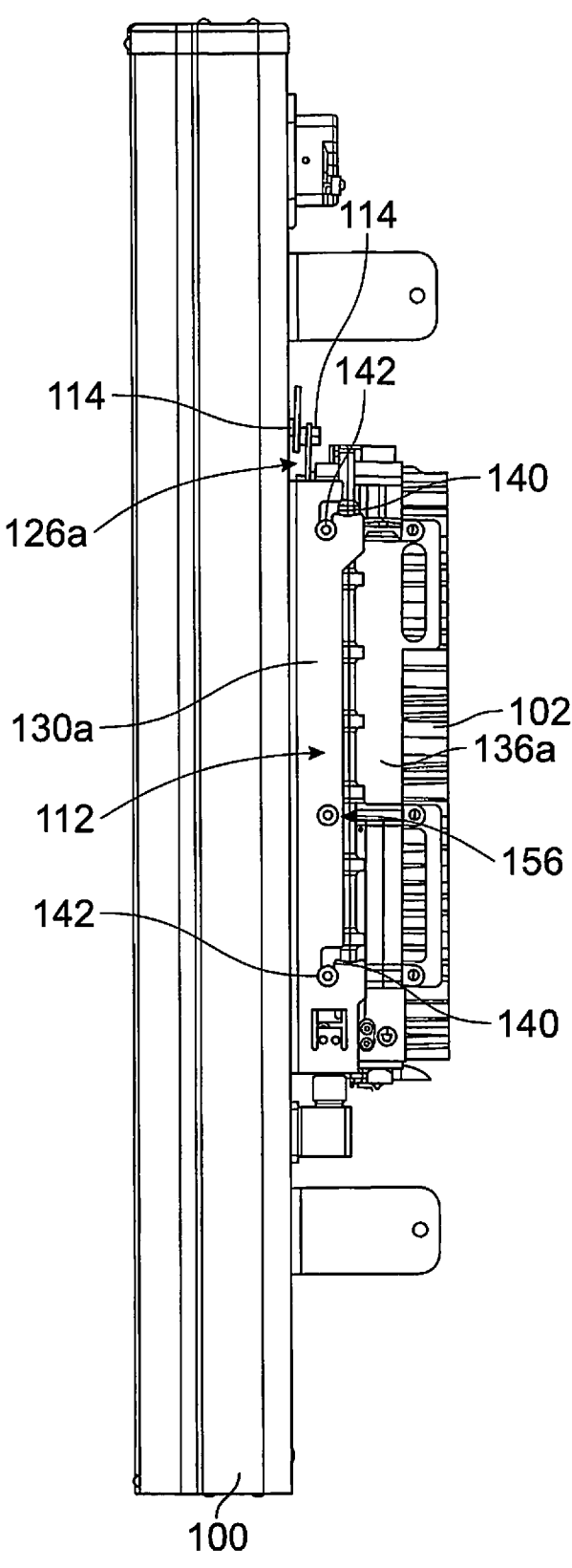
FIG. 3c is a sideview of the remote radio head assembly engaged with the RF connector of the antenna module, in accordance with one embodiment.

FIG. 3b illustrates installation lever 150 pushed upwardly forcing remote radio head 102 move down to create a tight fit between connector parts 242 of remote radio head and connector parts 240 of antenna module 100. Furthermore, FIG. 3c illustrates a sideview of the remote radio head 102 placed against guide rails 112, with shoulder screws slid down and resting within slot 142, bracket 126a including screw 114 for receiving installation lever 150.

In accordance with one embodiment as illustrated in FIG. 2a, back wall 90 also includes module 154. Module 154 is a remote-control motor called the Remote Electrical Tilt (RET) module. Some antennas have structures in them that electrically "tilt" the antenna pattern up or down. These structures can be driven by this remote-control motor.

Figure 4:
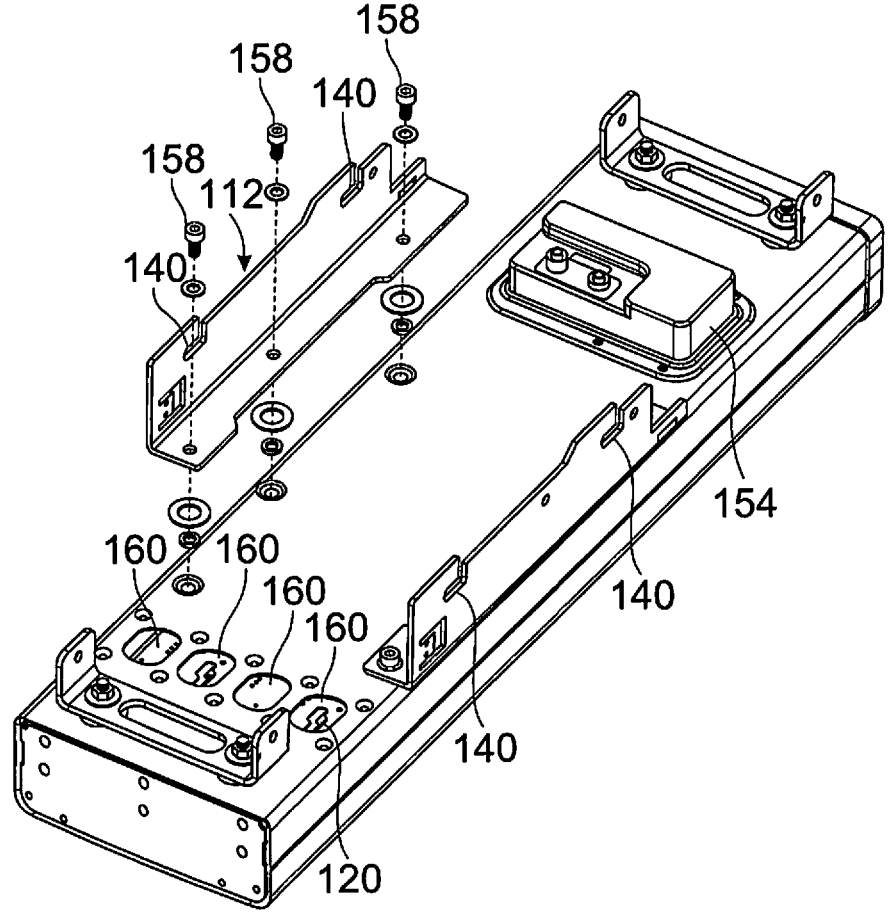
FIG. 4 illustrates installation of a guide rail and openings within the back side of an antenna module for connecting the input/output terminals of the antenna module to the outside RF connector in accordance with one embodiment.

In accordance with one embodiment, FIG. 4 illustrates screws 158 that are used to attach guide rail module 112 to the surface of back wall 90. As further illustrated, back wall 90 also includes four openings 160, configured to provide access to four input/output terminals 120 of an exemplary antenna module, such as antenna module 100.

It is noted that although in accordance with one embodiment described above in reference to pin 114 and its location somewhere in the middle of top bracket section 126a, in accordance with other embodiments the location of pin 114 is at any desired point along the width of bracket section 126a, as long as remote radio head is disposed in alignment with connector parts 240 of the antenna module. As it can be appreciated by those skilled in the art, installation lever 150 would exert a vertical force downward or upward regardless of the position of screw 114 along the width of top bracket section. Furthermore, in accordance with other embodiments, more than one pin 114 is employed, and installation lever 150 engages with the screw that is closest to slot 116.

Figure 5:
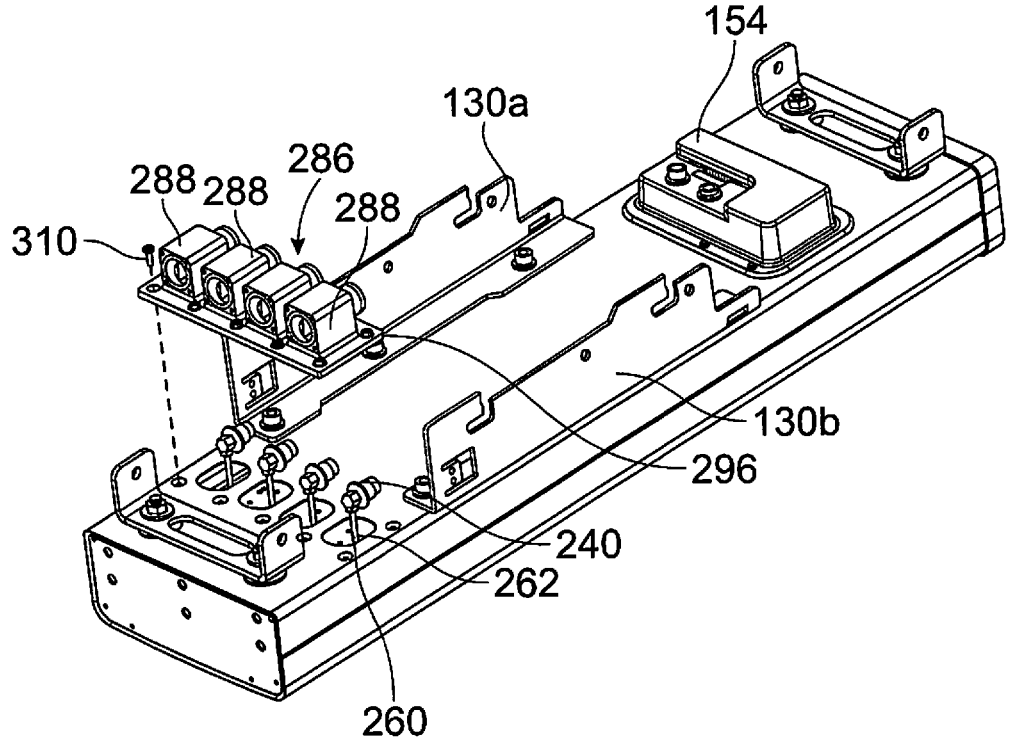
FIG. 5 illustrates a connector housing being installed over antenna module connectors that are coupled to input/output terminals of antenna module, in accordance with one embodiment.

To this end, FIG. 5 illustrates the input and output ports or terminals of antenna module 100 that are coupled via conductors 260 passed through a hollow support pin 262 to a first connector part 240 of a connector assembly, serving as the male connector part of the assembly, which is intended to couple to the second connector part 242 of the connector assembly (FIG. 7), serving as the female part of the assembly, accordingly, coupled to the input/output terminals 238 of remote radio head 102, as illustrated in FIG. 7.

In accordance with one embodiment, the connector assembly configured to couple the input/output terminals 120 of the antenna module to the input/output terminals of the remote radio head are a modified spring-loaded blind mate 4.3-10 connector assembly, which is a radio frequency industry standard used in radio frequency systems. Preferably, the push pull type connector is employed in accordance with one embodiment. In a blind-mate connection, for the male and female parts the mating action happens via a sliding or snapping action, with a self-aligning feature that allows for misalignments of the two parts during mating. This feature accommodates for any misalignment between connector parts of remote radio head 102 and connector parts of antenna module 100, when they are juxtaposed near each other as the remote radio head is pushed down towards the connectors of the antenna module as illustrated in more detail in reference to FIG. 8.

Figure 6A:
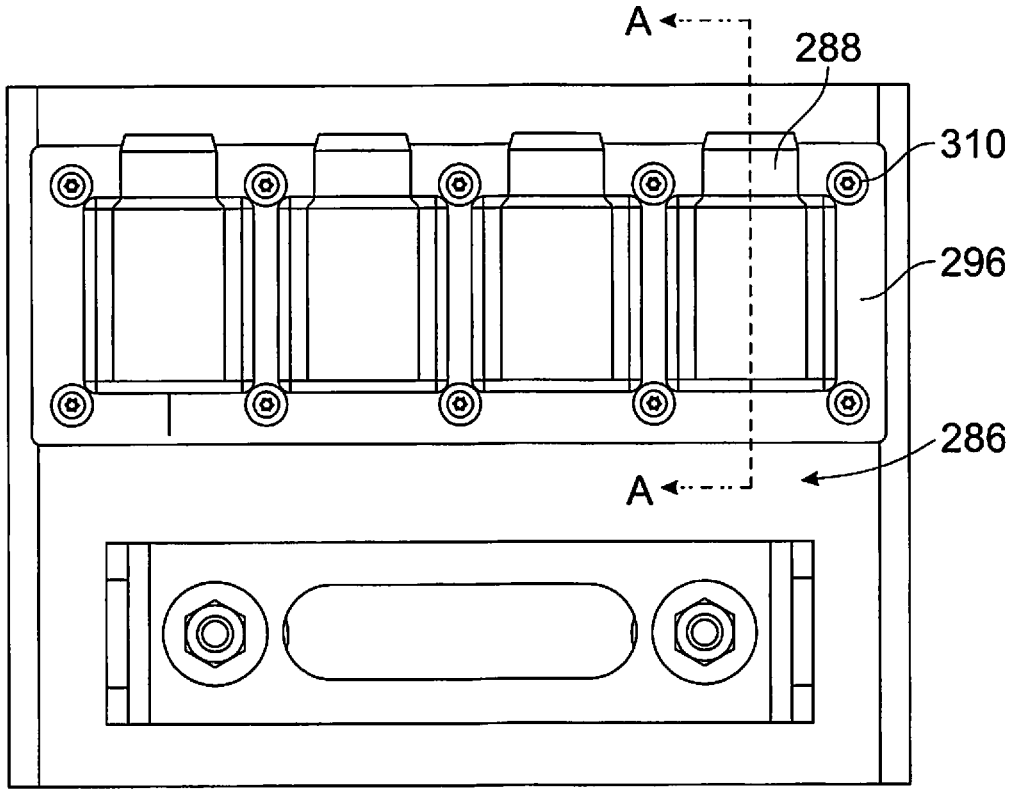
FIG. 6a is a top view of connector housing illustrated in FIG. 5 in accordance with one embodiment.
Figure 6B:
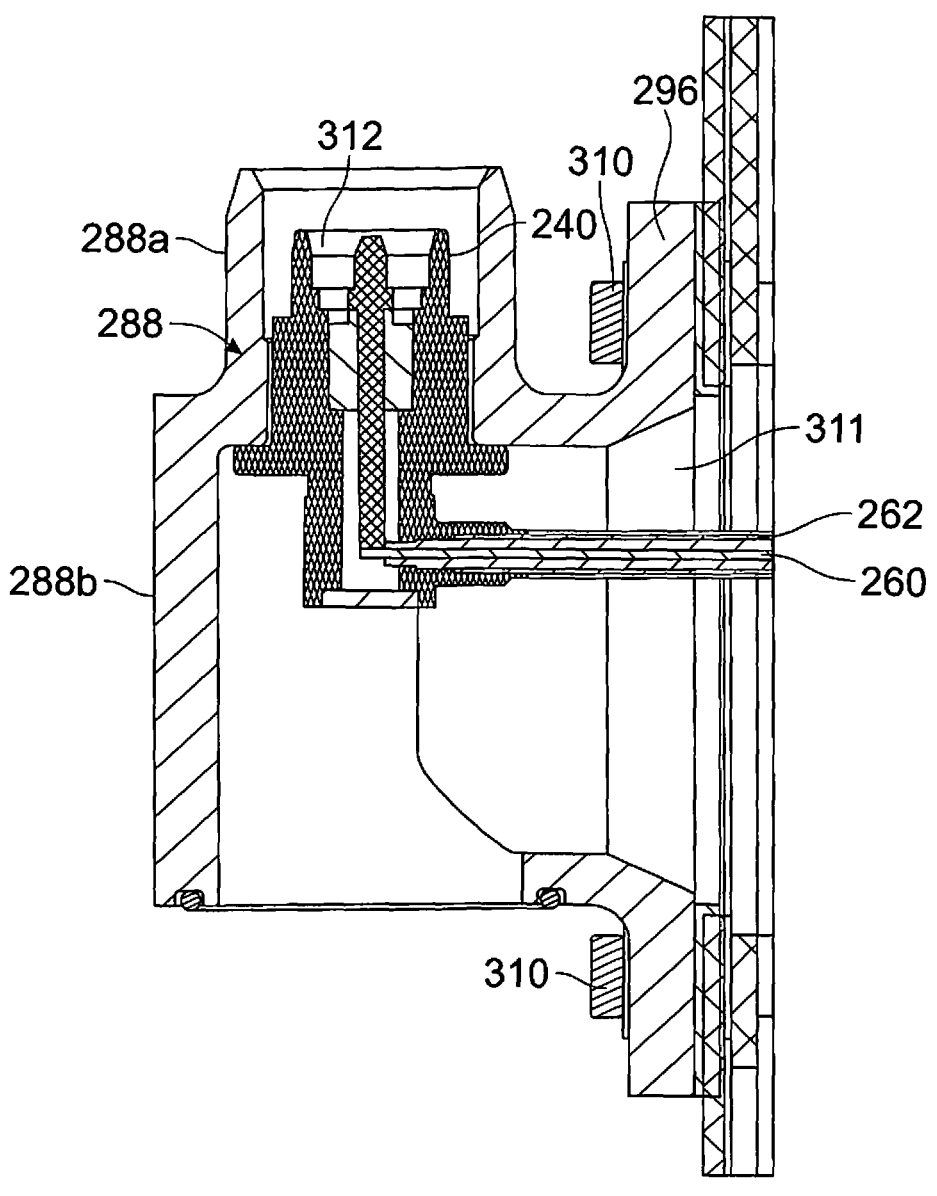
FIG. 6*b* is a cross section view of connector housing illustrated in FIGS. 5 and 6*a*, in accordance with one embodiment.

FIGS. 5, 6a and 6b also illustrate a connector housing assembly 286 configured to provide a covering and protection for connector parts 240, where FIG. 6a illustrates a top view of housing assembly 286 and FIG. 6b illustrates a side view of housing assembly 286 along section A-A illustrated in FIG. 6a.

Each connector part 240 in accordance with one embodiment of the invention is a male part of a blind mate connector such as 4.3-10 connector. Connector part 240 is connected and receives and transmits signals to input/output ports of antenna module 100. As illustrated further in FIG. 5, connector part 240 is supported by a solid and hollow pin 262 that extends perpendicularly away from antenna module 100. A conductor such as a wire 260 passes through pin 262 to electrically couple input/output terminals of antenna module 100 to each connector part 240. This arrangement allows input/output terminals of antenna module 100 to have access to the external space of the antenna module.

As illustrated in FIGS. 5, and 6a-6c, in accordance with one embodiment, connector housing assembly 286 includes housing units 288 each sized and configured to fit over a corresponding connector part 240. In one embodiment, connector housing assembly 286 is molded as one unit integrating housing units 288 with a rectangular flat surface 296 having four holes located on each corner of the surface for receiving screws 310 (FIG. 5) to securely seal openings 160 by attaching to back wall 90 of antenna module 100. Housing units 288 have three side walls shown in FIG. 5 and an opening side 311 (FIG. 6b), to allow connector parts 240 to fit inside each housing unit 288. The top portion (distal end) 288a of each housing unit 288 is configured to surround the top portion 312 of each connector part 240 as illustrated in FIGS. 5 and 6b. Housing unit 288 and surface 296 as an integrally molded unit provide protection to connector parts 240 from outside elements, such as sun, wind, and rain.

In accordance with one embodiment, housing unit 288 and flat surface 296 are made of preferably plastic. Plastic materials are best suited to prevent passive intermodulation from the metal connectors. In accordance with one embodiment, the material chosen is Acrylonitrile Styrene Acrylate (ASA) glass filled material. This has strength, lightweight, UV protection, and moldability. Other plastics compromises would have to be made with UV protection and/or strength.

Figure 6C:
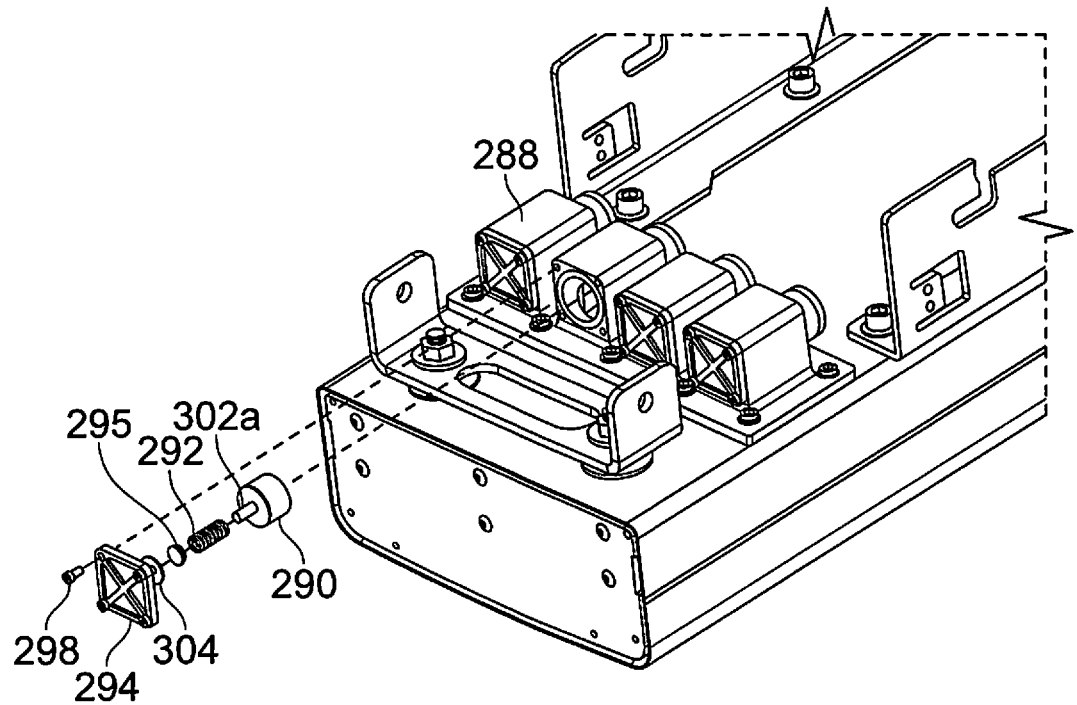
FIG. 6*c* illustrates a spring assembly and the bottom side of connector housing illustrated in FIGS. 5, 6*a* and 6*b* in accordance with one embodiment.

Referring to FIGS. 6c, the remaining structure of housing assembly 286 is illustrated in more detail in accordance with one embodiment. Accordingly, a spring support module 290 is placed below connector part 240, the spring support module having a base surface and top walls juxtaposed around the bottom portion of each connector part 240 as better illustrated in FIG. 8, so as to allow connector part 240 to move in cohesion with spring support 290 as it is pushed down and upwardly. Spring support module 290 also includes pin 302 connected to the outside of its base surface. Spring 292 is mounted around pin 302, so that one end of it is disposed near the base surface of connector part 240 and the other end is held by a flat pin 295. A base plug 294 is further disposed to seal the bottom of each housing unit 288, attached to the bottom of the housing unit with four screws 298. Base plug 294 includes a base plug sleeve 304 configured to surround the bottom portion of spring 292 and flat pin 295 creating a waterproof seal for each housing unit from the bottom side as well.

To this end, there are various advantages when the connectors in the antenna module are spring loaded. Support module 290 along with pin 302 ensure an axial and radial alignment with the connectors staying perpendicular to radio connector face, as they remain aligned along base plug 294 and base sleeve 304 functioning as an alignment cover, supporting the spring and ensuring that the spring is applying the force in the correct direction. The spring-loaded connectors in the antenna module are preloaded to ensure solid electrical connection. The spring-loaded connectors have other benefits in that tolerances can be overcome with a connector that has flexibility in moving up and down. Spring 292 maintains a force on the radio connectors to maintain a solid mechanical and RF connection through vibration and shock loads on the unit.

FIG. 7 illustrates a connector part 242 of remote radio head 102 which in one embodiment is the male part of blind mate connector assembly, such as one defined in accordance with connector 4.3-10 standards. Connector part 242 is coupled to the input/output ports of remote radio head 102.

Figure 8:
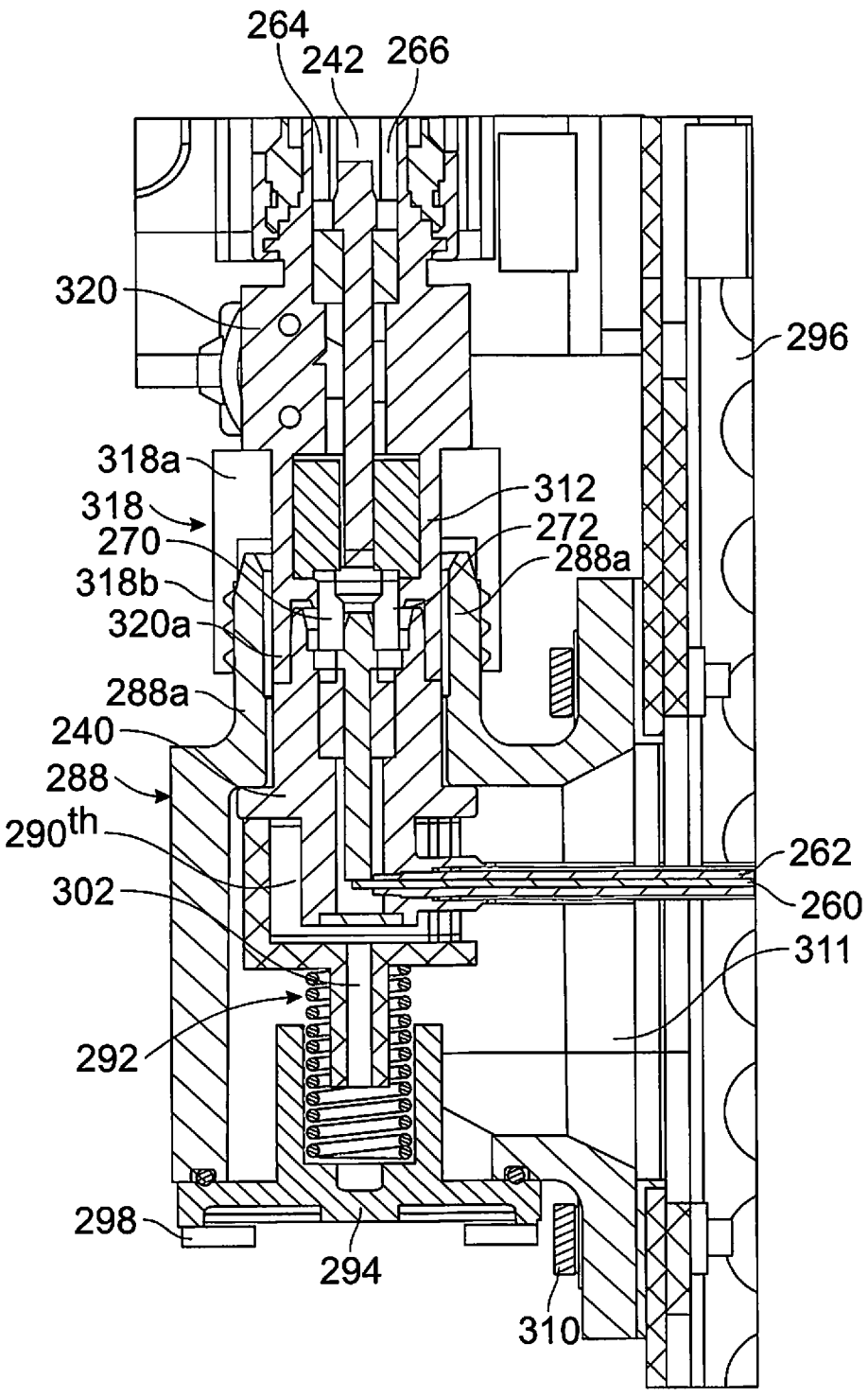
FIG. 8 illustrates a cross section view of connectors and connector housing where the remote radio head connector part is engaged with antenna module connector part in accordance with one embodiment.

As such, FIG. 8 illustrates a cross section view of the blind mate connector assembly when remote radio head 102 is coupled to the terminals of antenna module 100. Connector part 242 is connected to coupler 320.

In some applications coupler 320 is optionally installed, in accordance with one embodiment, to couple off electrical signals from the main electrical path. One side of coupler 320 includes a circular plate with 4 screws and a connector functioning as a coupled port. Typically, if a coupler 320 is installed, the main radio signal travels through the coupler and a small amount of power is coupled off and available at the coupled port for monitoring.

The blind mate connector assembly in accordance with one embodiment, does not have threads and nut for securing the male to female connector parts and is instead stabilized with the spring 292 (FIG. 8) and locking screws 156 (FIG. 3a).

To this end, one difference of the blind mate connector assembly described herein and a standard 4.3-10 is how the mated connection is secured. A standard 4.3-10 female connector has a threaded outer housing which is compatible with a coupling nut on the male connector. The nut screws onto the threads and holds the interface stable.

Distal end 320a of coupler 320 has a length sufficient to allow full contact and engagement with connector part 240 as the remote radio head 102 is moved downwardly with the force exerted by installation lever 150. A connector boot 318 is attached to coupler 320 and covers the distal end 320a of coupler 320, as well as the distal end 288a of connector housing unit 288 as coupler 320 moves towards connector portion 240. To this end, the diameter of proximal portion 318a of connector boot 318 is approximately equal to the diameter of distal portion 320a of coupler 320 to securely surround it as a sleeve, while the diameter of distal portion 318b of connector boot 318 is large enough to cover both distal portion 320a of coupler 320 and distal portion 288a of connector housing 288 as a sleeve. Distal end portion 320a of coupler 320 and the attached connector boot 318 are free to move within and around connector housing 288 as illustrated in FIG. 8.

It is noted that in accordance with another embodiment where there is no coupler 320 installed, each connector part 242 has a structure similar to coupler 320 for engagement with connector parts 240. Instead of being attached to coupler 320, connector boot 318 is attached to connector part 240 and covers the distal end of connector part 240. The distal end portion of connector part 240 and the attached connector boot 318 are free to move within and around connector housing 288.

As coupler 320 moves towards portion 288a, spring support 290 exerts a force against spring 292 causing the spring to move from its relaxed position or preferably preloaded position to a compressed position. Meanwhile, pins 270, 272 of connector part 242 couple to pins 264, 266 of connector part 240 when the two connector parts of the blind mate assembly are pressed against each other. As remote radio head 102 is forced down against connector part 240, spring 292 compresses downwardly, allowing its stored compression to releasably push back connector part 240 when remote radio head 102 is pulled back up from its connection to antenna module 100.

FIGS. 9-14h illustrate another embodiment wherein the remote radio heads are installed by sliding them along a mounting rail module sideways and engaging the radio head connectors with the antennal module connectors by using a mounting lever that is pivotally moved in the downward and upward direction as discussed in more detail below in reference to the corresponding figures.

Figure 9:
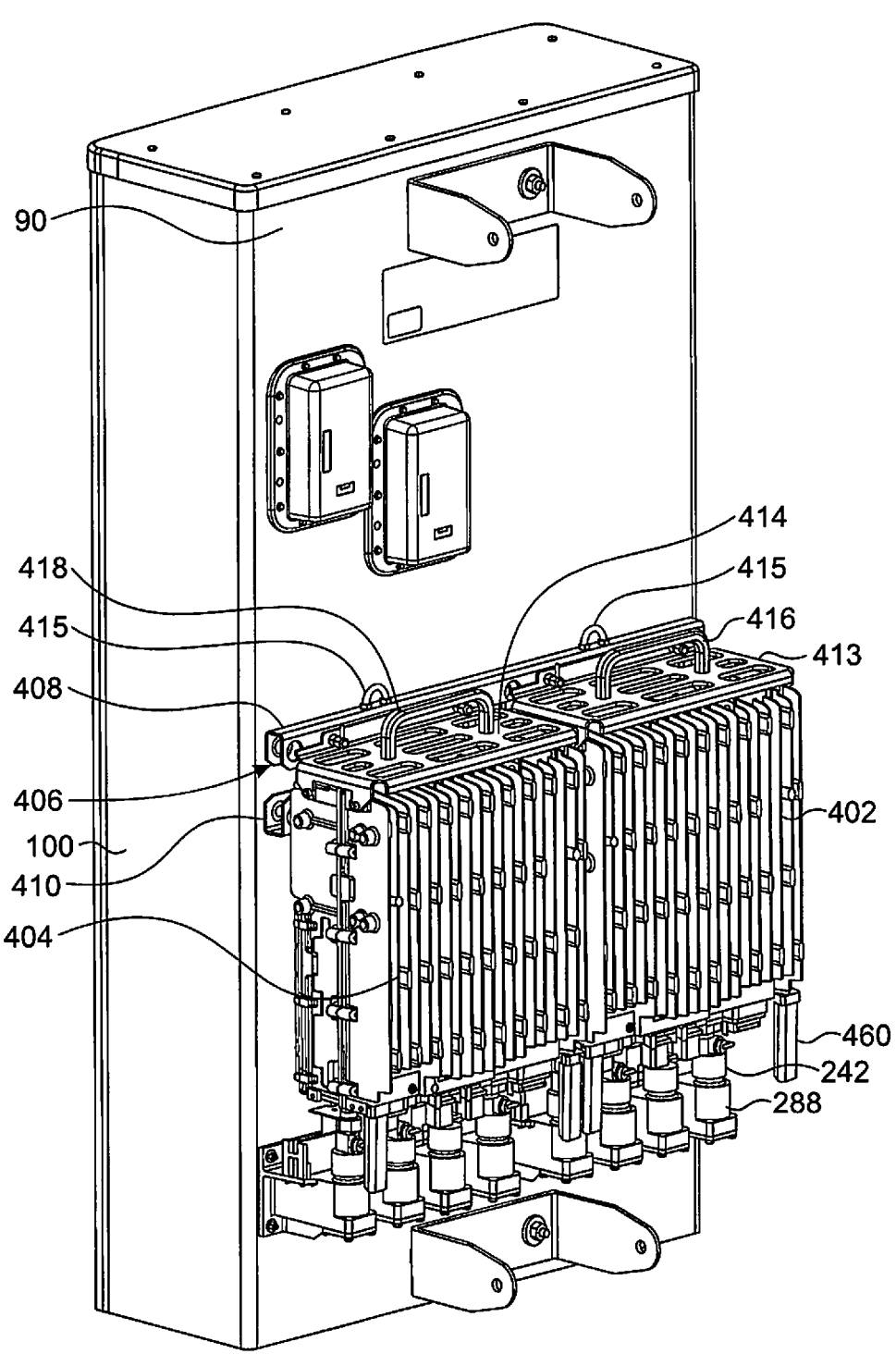
FIG. 9 illustrates a couple of remote radio heads attached to a back side of a cellular antenna unit in accordance with another embodiment.

To this end, FIG. 9 illustrates two remote radio heads 402 and 404 installed on the back wall 90 of a cellular antenna module 100. The remote radio heads include a mounting bracket such as 411 and 414 with handles 416 and 418 configured for easy handling of the remote radio heads. Remote radio heads 402 and 404 also have a radio spacer guide rail (not shown) coupled to their back side that slides along mounting rail module 406. Sliding mounting rail module 406 includes an upper guide rail 408 and a lower guide rail 410 separated at a distance that allows for the spacer guide rail to slide through to their intended location for allowing remote radio heads 402 and 404 to electrically couple to the antenna module. Connector housing 288, along with connector part 242 of the remote radio heads 402 and 404 have been described in more detail above in reference with FIGS. 5-8.

Figures 10A, 10B:
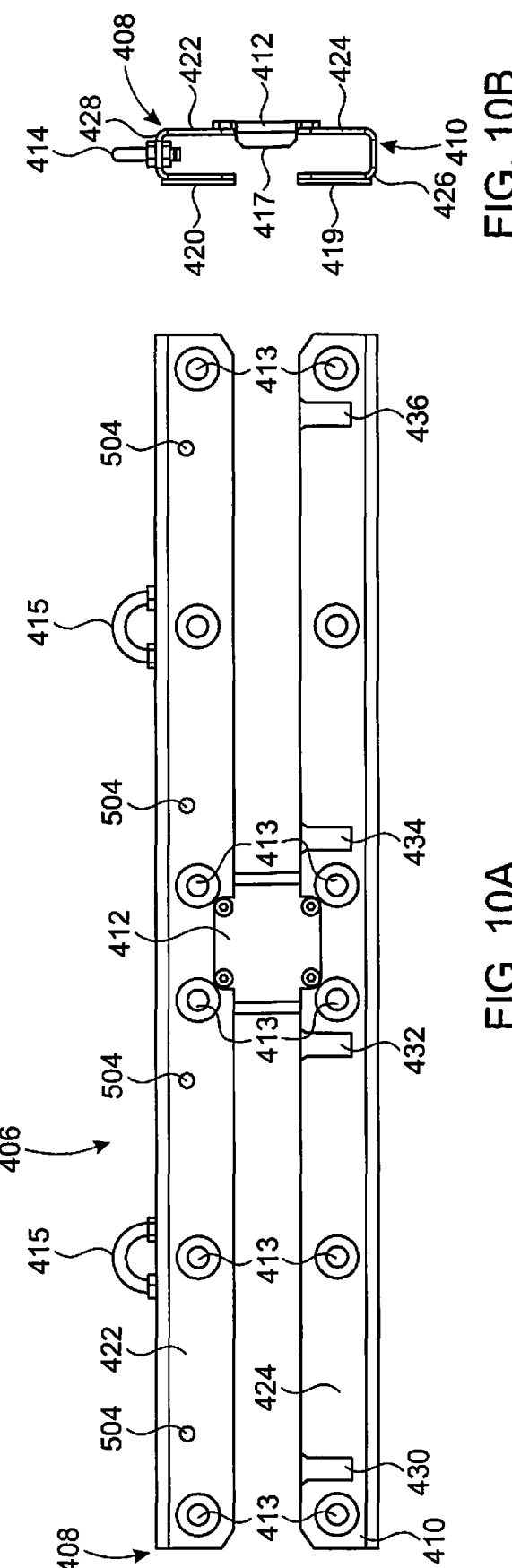
FIGS. 10*a* through 10*d* illustrate a mounting rail attachment in accordance with one embodiment.
Figure 10C:
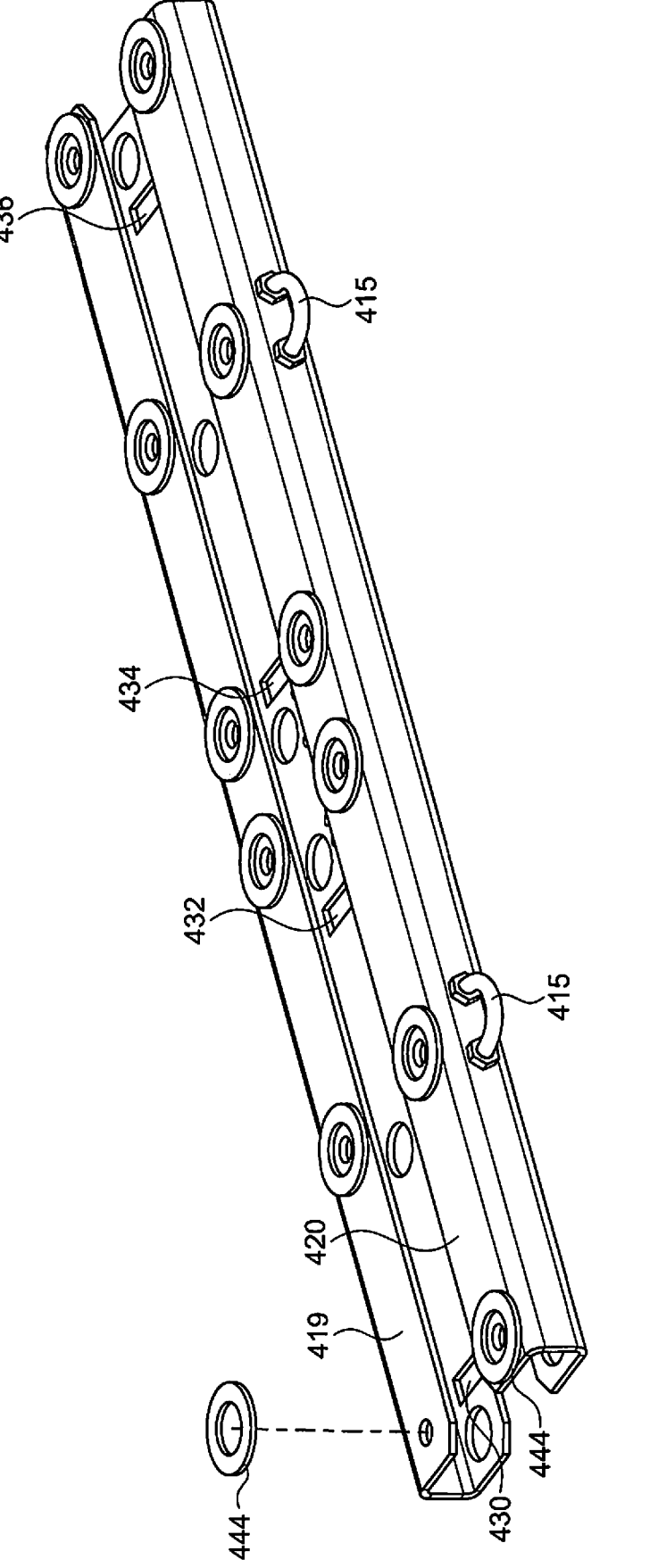
Figure 10D:
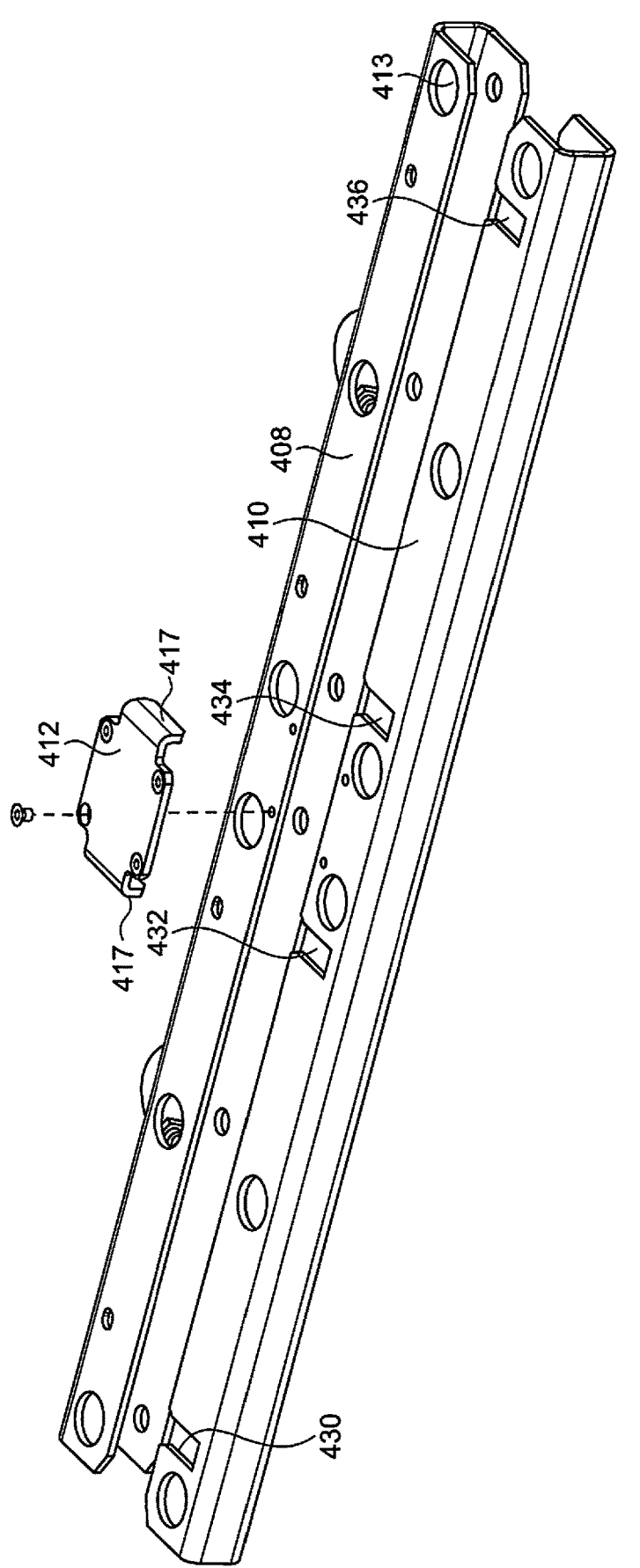

FIGS. 10a and 10d illustrate the structure of mounting rail module 406 in more detail in accordance with one embodiment. As mentioned above, mounting rail module 406 includes an upper guide rail 408 and a lower guide rail 410 attached to each other by a connector plate 412, shown in more detail in FIG. 10d. Connector plate 412 includes a flat surface with a stopper plate 417 extending from each of its ends. Stopper plates 417 protrude within the hallow space formed by the upper and lower guide rails, configured to prevent remote radio heads 402 and 404 to slide any further when an operator slides them through mounting rail module 406. Connector plate 412 includes four (4) threaded holes at each corner to accommodate screws that attach plate 412 to upper and lower guide rails 408 and 410 at a distance that accommodates the sliding of remote radio heads 402 and 404 along mounting rail module 406. Through holes 413 positioned along the length of each of lower and upper guide rails 408 and 410 facilitate the process of attaching mounting rail module 406 to the back wall 90 of the cellular antenna module.

FIG. 10b illustrates the side profile of mounting rail module 406 wherein upper guide rail 408 includes a front wall 422, a top wall 428 and a back wall 420. Similarly, lower guide rail 410 includes a front wall 424, a bottom wall 426 and a back wall 419. Mounting rail module also includes pivot hooks 415 configured to accommodate a lever for pushing and pulling the remote radio heads 402 and 404 downwardly and upwardly when the operator engages the lever with the corresponding pivot hook 415 to allow the corresponding connectors of remote radio heads 402 and 404 to electrically couple with the connectors of the antenna module in a blind mate arrangement as described in more detail in reference to FIGS. 7 and 8.

FIGS. 10a and 10d illustrate guide slots 430, 432, 434, and 436 in lower guide rail 410 of mounting rail module 406 that are configured to accommodate radio guide spacers corresponding with remote radio heads 402 and 404. More specifically each remote radio head in accordance with one embodiment includes at least one and preferably two spacer guide rails that slide between upper and lower guide rails 408 and 410 until they stop in an aligned arrangement with the guide slots and are subsequently pushed down within the guide slots for the blind mate connection explained above.

Figure 11:
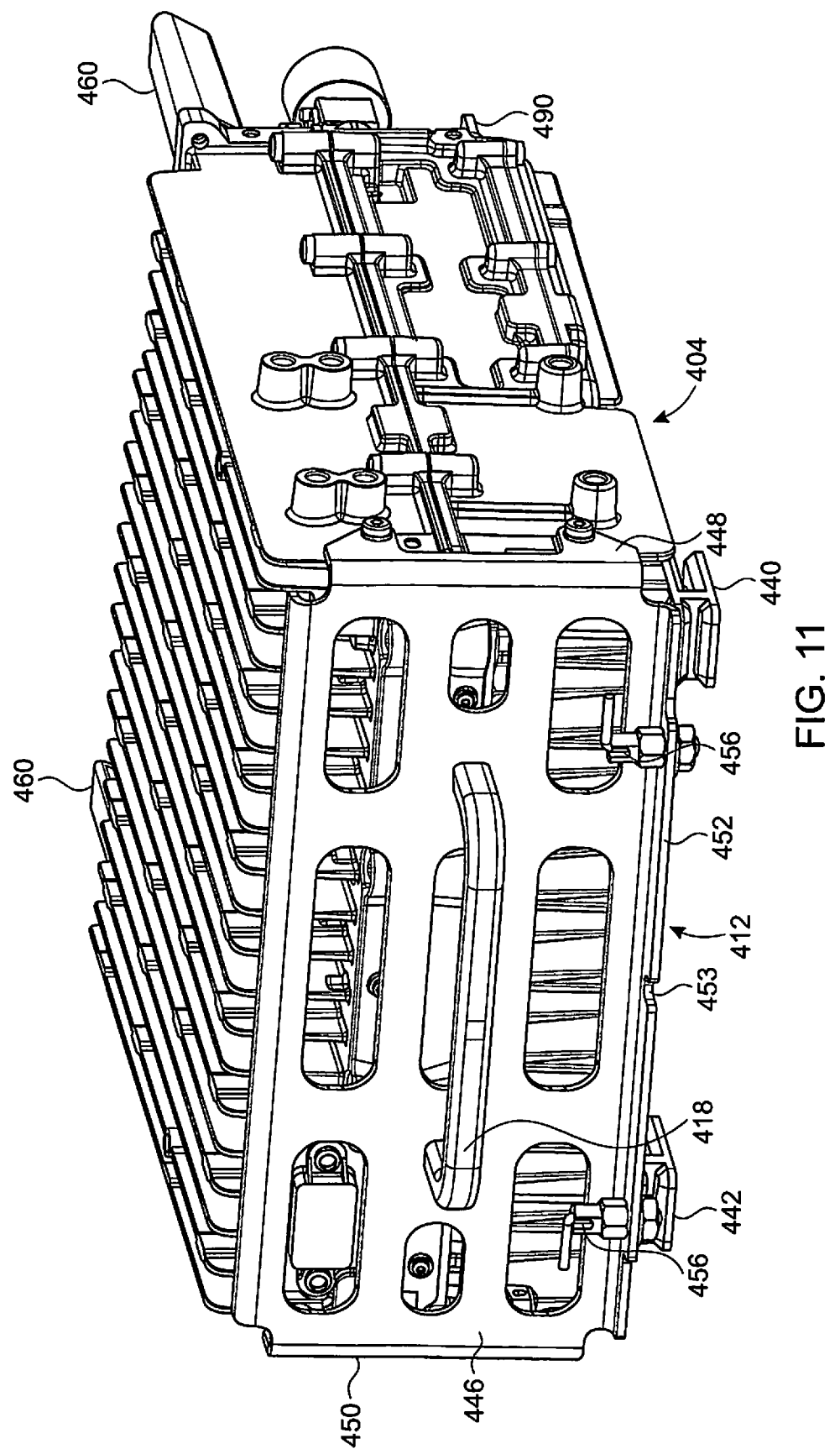
FIG. 11 illustrates the mounting bracket attached to the radio head in accordance with one embodiment.

In accordance with another embodiment, FIG. 11 illustrates a remote radio head mounting bracket 412 that is affixed to one exemplary remote radio head such as 404 for allowing the user to carry, install, and uninstall the radio head for its intended purpose. Mounting bracket 412 includes a top plate 446 extending from each side, to side plates 448 and 450, each slide plate 448/450 having through holes for employing screws that attach mounting bracket 412 to the remote radio heads 402 and 404. Top plate 446 includes a handle 418 for use by an operator to move remote radio head 404 around. Mounting bracket 412 also includes a back plate 452 that extends vertically away from the top plate. Back plate 452 includes two holes on each side through which L-handle retractable spring plungers 456 are connected as will be described later in reference to FIG. 13. Each of the spring plungers 456 can be set to a locked or unlocked position, by manipulating the L handle 486. FIG.

11 also illustrates support legs 460 and a support plate 490 attached to the bottom of remote radio head 404 to protect it when the radio head is placed on the floor. It is understood that the features above shown in FIG. 11 for remote radio head 404 are likewise present in remote radio head 402.

Figures 12A, 12B, 12C:
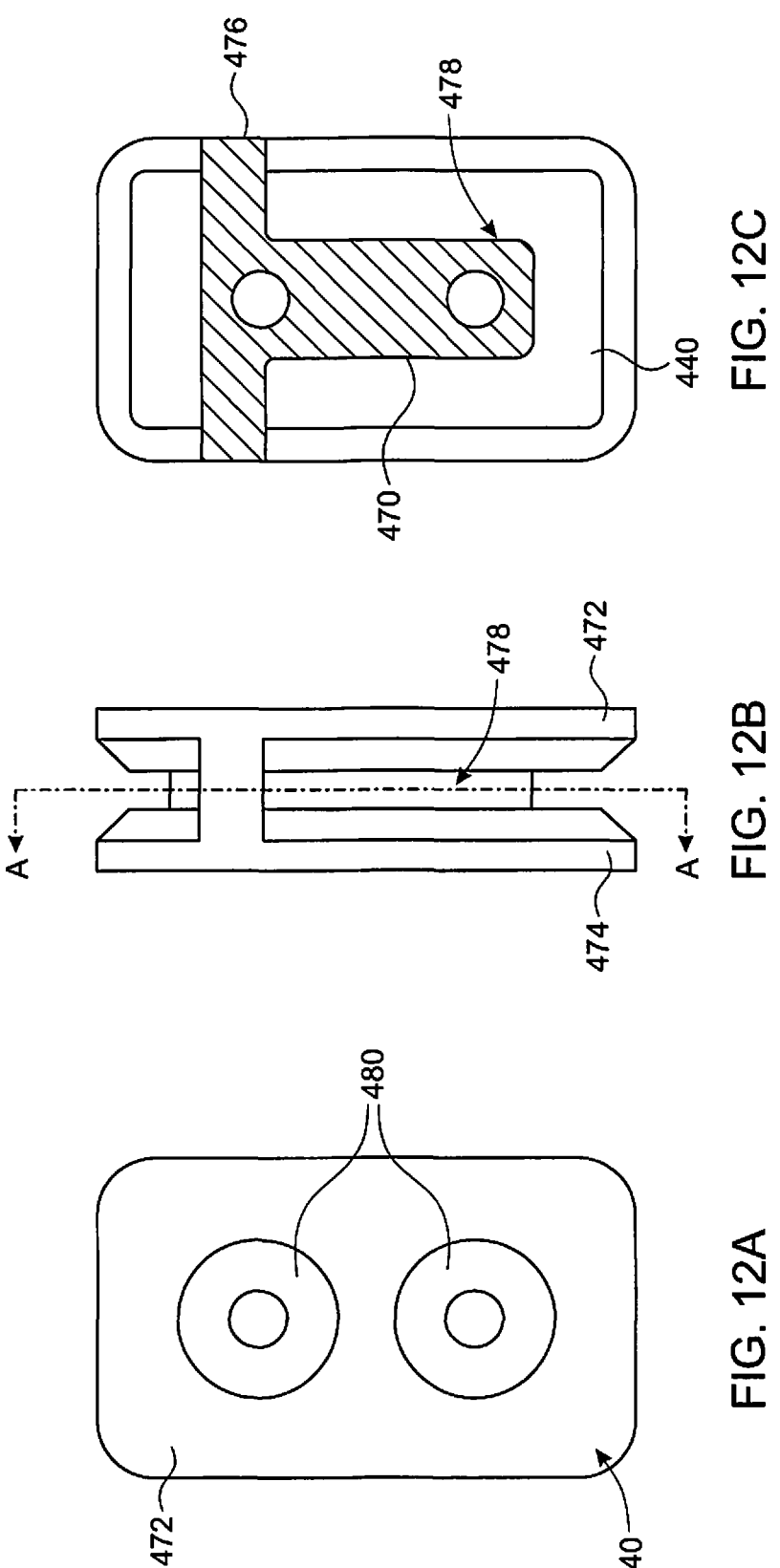
FIGS. 12*a*-12*c* illustrate a radio guide spacer attached to the radio head in accordance with one embodiment of the invention.

As further illustrated in FIG. 11, radio guide spacers 440 and 442 are attached to the back side of an exemplary remote radio head such as 404 as well. A more detailed structure of radio guide spacers 440 and 442, such as the exemplary radio guide spacer 440, is shown in reference to FIGS. 12a-12c. FIG. 12a shows front plate 472 of radio guide spacer 440 having two through holes. FIG. 12b is the side view of radio guide spacer 440 showing front plate 472 and back plate 474, as well as T-shaped bracket 478 sandwiched between front and back plates 472 and 474. To this end, FIG. 12c illustrates a cross section A-A of FIG. 12b that shows the sandwiched T-shaped bracket 478 having a vertical plate 470 and a horizontal plate 476. The width of vertical plate 470 is configured to align with the corresponding guide slots, such as 430, 432 of lower guide rail 410 of mounting module 406 or guide slots 434, 436 of lower guide rail 410 accordingly. Similarly, the thickness of radio guide spacer 440 is configured to align with the corresponding thickness of the front plates of upper and lower guide rails 408 and 410 allowing the radio guide spacer to slide along mounting module 406 until vertical plates 470 of radio guide spacers 440 and 442 are positioned against the corresponding guide slots such as 430 and 432.

Figure 13:
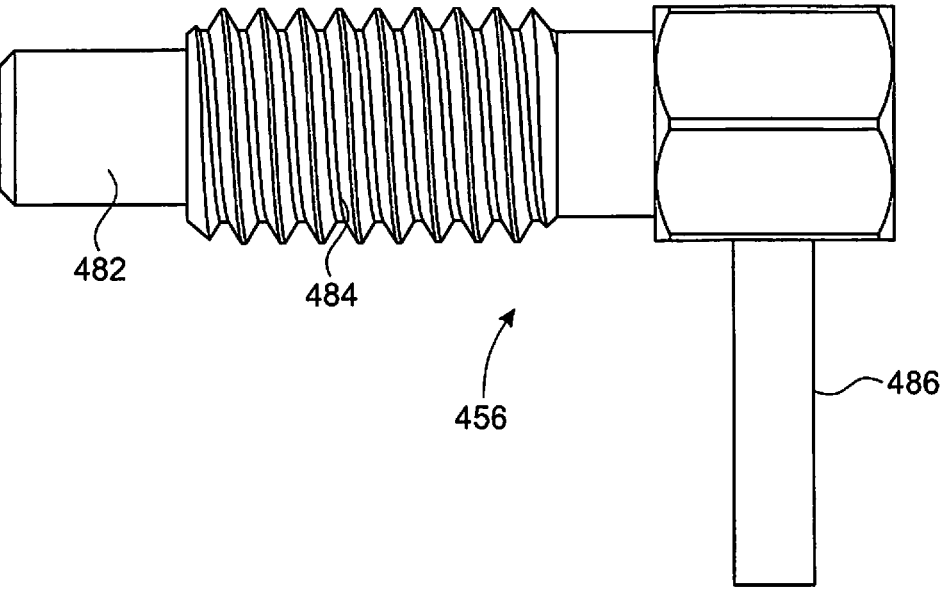
FIG. 13 illustrates a retractable spring plunger attached to the mounting bracket in accordance with one embodiment.

FIG. 13 illustrates an exemplary retractable spring plunger 456 in accordance with one embodiment. The plunger includes a retractable pin 482, abutted against a spring (not shown) and enclosed by a threaded portion 484 and a locking handle 486. During operation, plunger 482 can be pulled back in a retracted position and locked in that position by rotating handle 486. The plunger can then be released by rotating handle 486 again to an unlock position. L-handle 486 of plunger 456 is configured to be in a horizontal position when the plunger is retracted in a locked position and is configured to be in a vertical position when the plunger is released in an unlocked position.

Figure 14C:
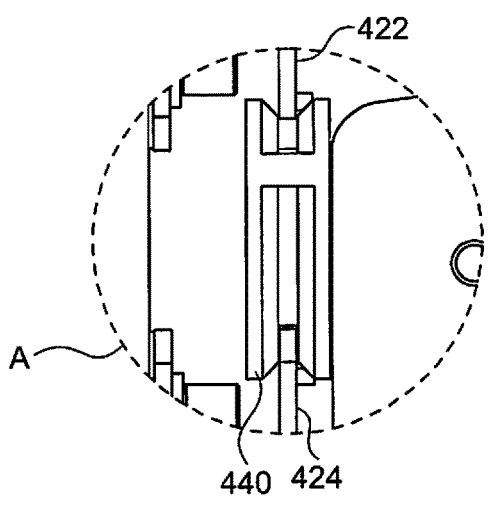
FIGS. 14*a*-14*d* illustrate the steps for installing a radio head assembly on the back side of a cellular antenna unit in accordance with one embodiment.
Figure 14D:
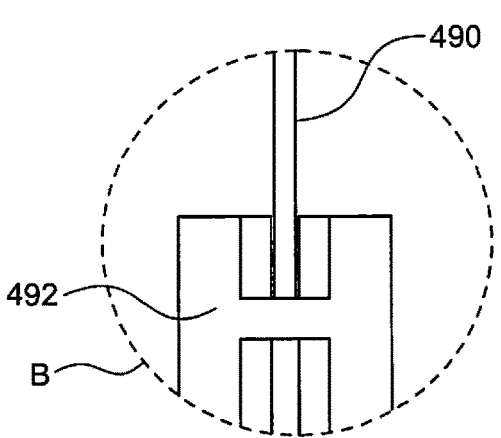
Figure 14A:
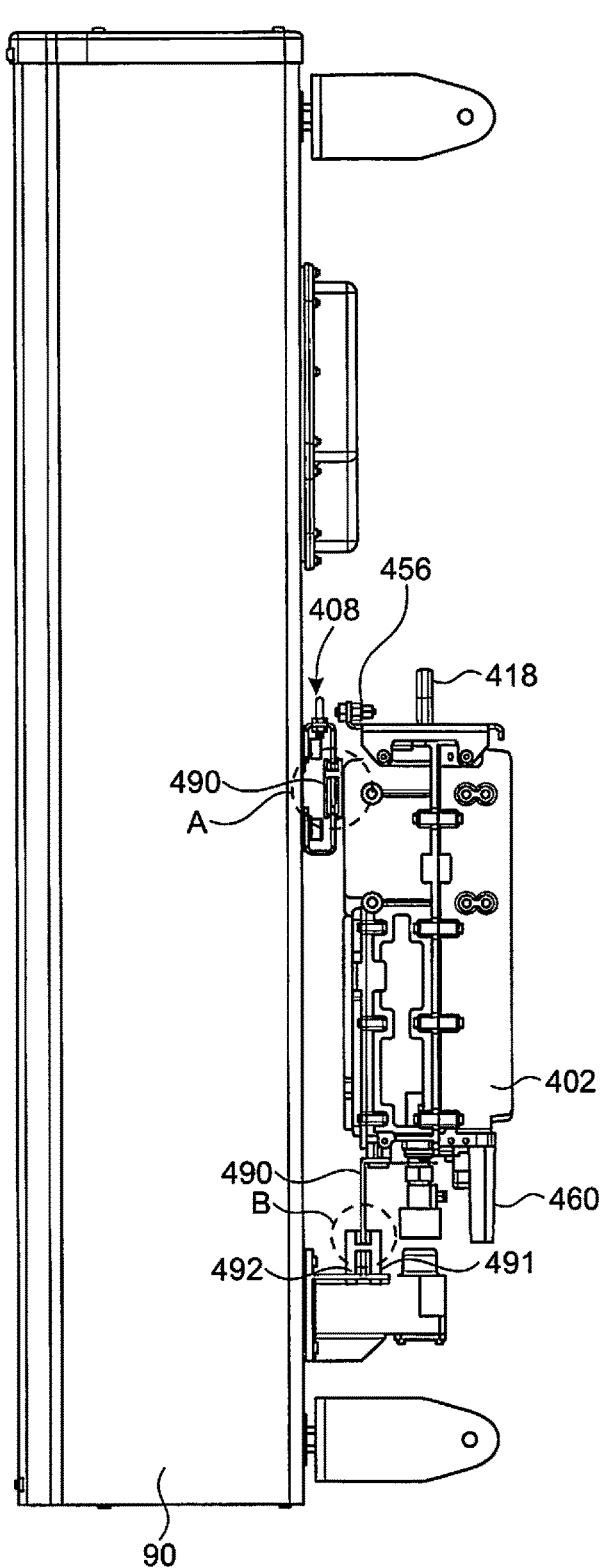
Figure 14B:
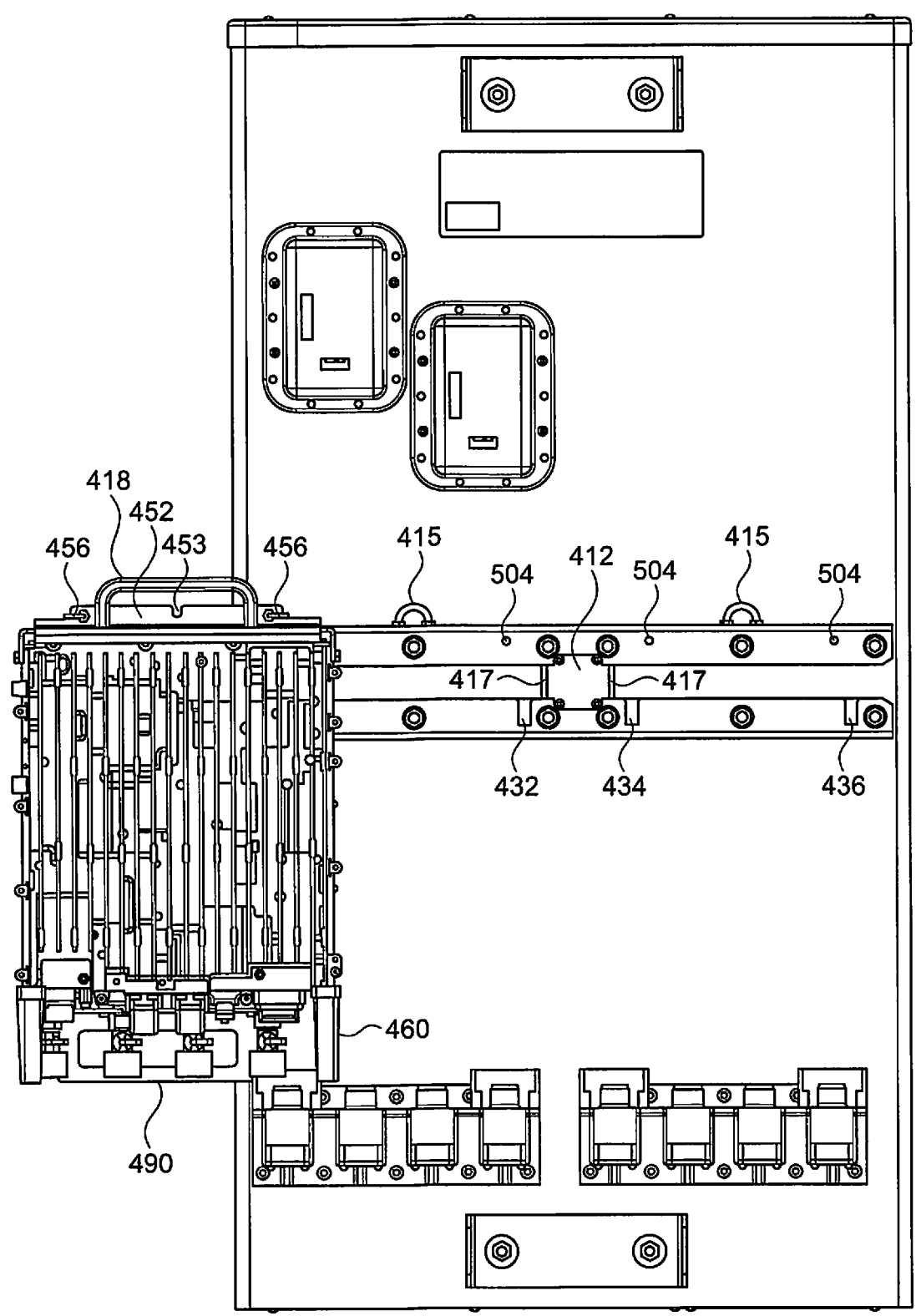

FIGS. 14a through 14h illustrate the process of installing and uninstalling remote radio heads 402 and 404 in accordance with one embodiment. To this end, FIG. 14a illustrates the step where the user aligns radio spacer guide 440 along the channel in mounting rail module 406 formed by upper guide rail 408 and lower guide rail 410. During this installation step, the installer retracts and locks plunger 456 so as to allow the remote radio head to slide along the mounting rail module, until it is stopped by connector plate 415. At this step, vertical plates 470 of brackets 442 and 440 are partially engaged with guide slots 432 and 430 respectively. FIG. 14b illustrates the front view of remote radio head 404 as its being slid along mounting rail module 406.

Figure 14E:
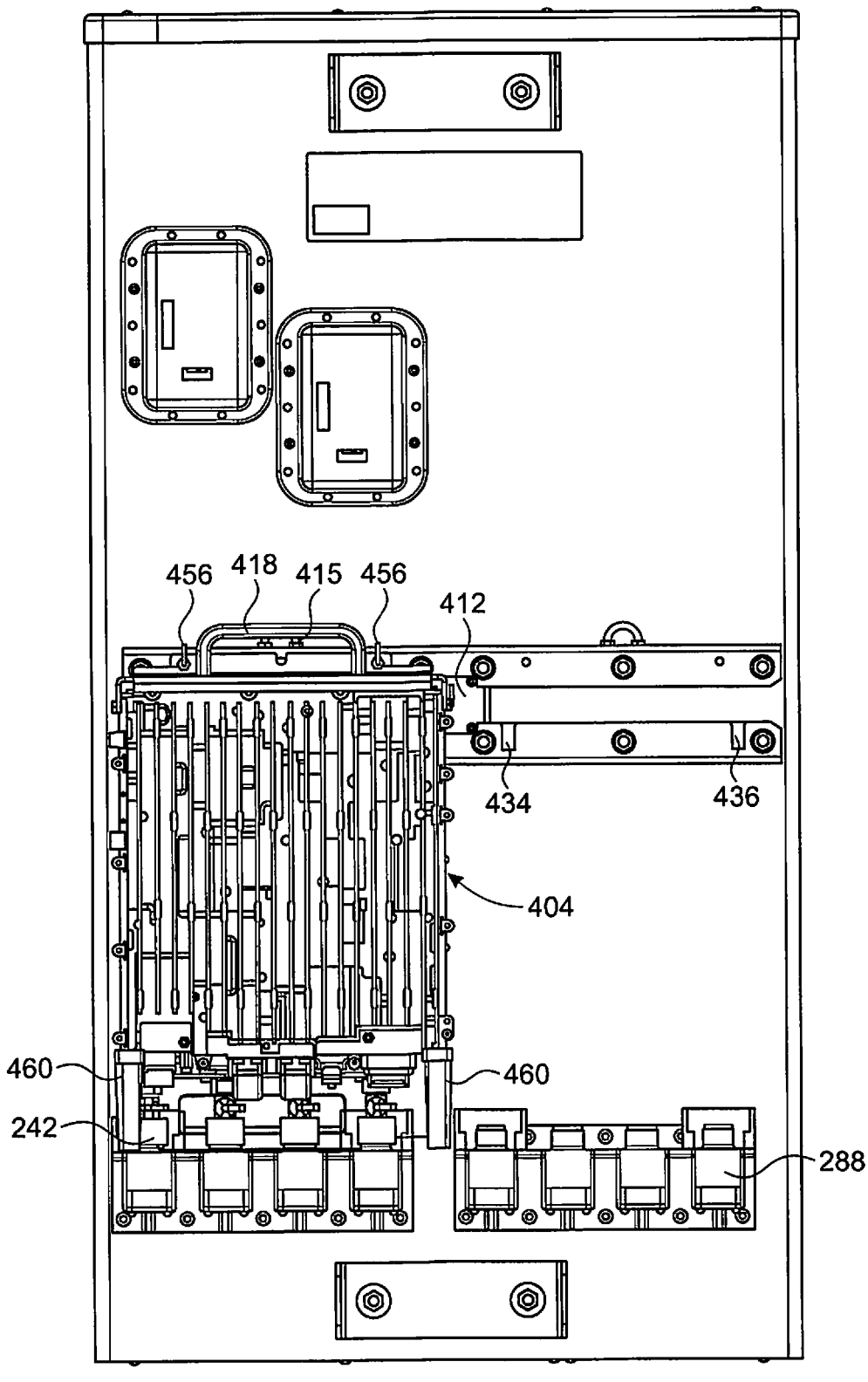
FIGS. 14*e*-14*g* illustrate the remaining steps for installing the radio head assembly in accordance with one embodiment.

FIG. 14c illustrates an enlarged view of radio spacer guide 440 as its front plate and back plates 472, 474 are being slidingly engaged with the front walls 422-424 of upper and lower guide rails of mounting rail module 406, while FIG. 14d illustrates an enlarged view of support plate 490 as it slides within a lower mounting plate 491. As T-shaped bracket 478 slides beneath and over front plates 422 and 424 respectively, it comes to a stop by plate 417 and above the guide slots such as 430-432 of lower guide rail 410 of mounting rail module 406. At this step the operator releases the retractable plunger 456 in response to which pins 482 are released against the front surface 422 of mounting rail module 406 slightly above holes 504, as illustrated by FIG. 14e in accordance with one embodiment.

Figure 14F:
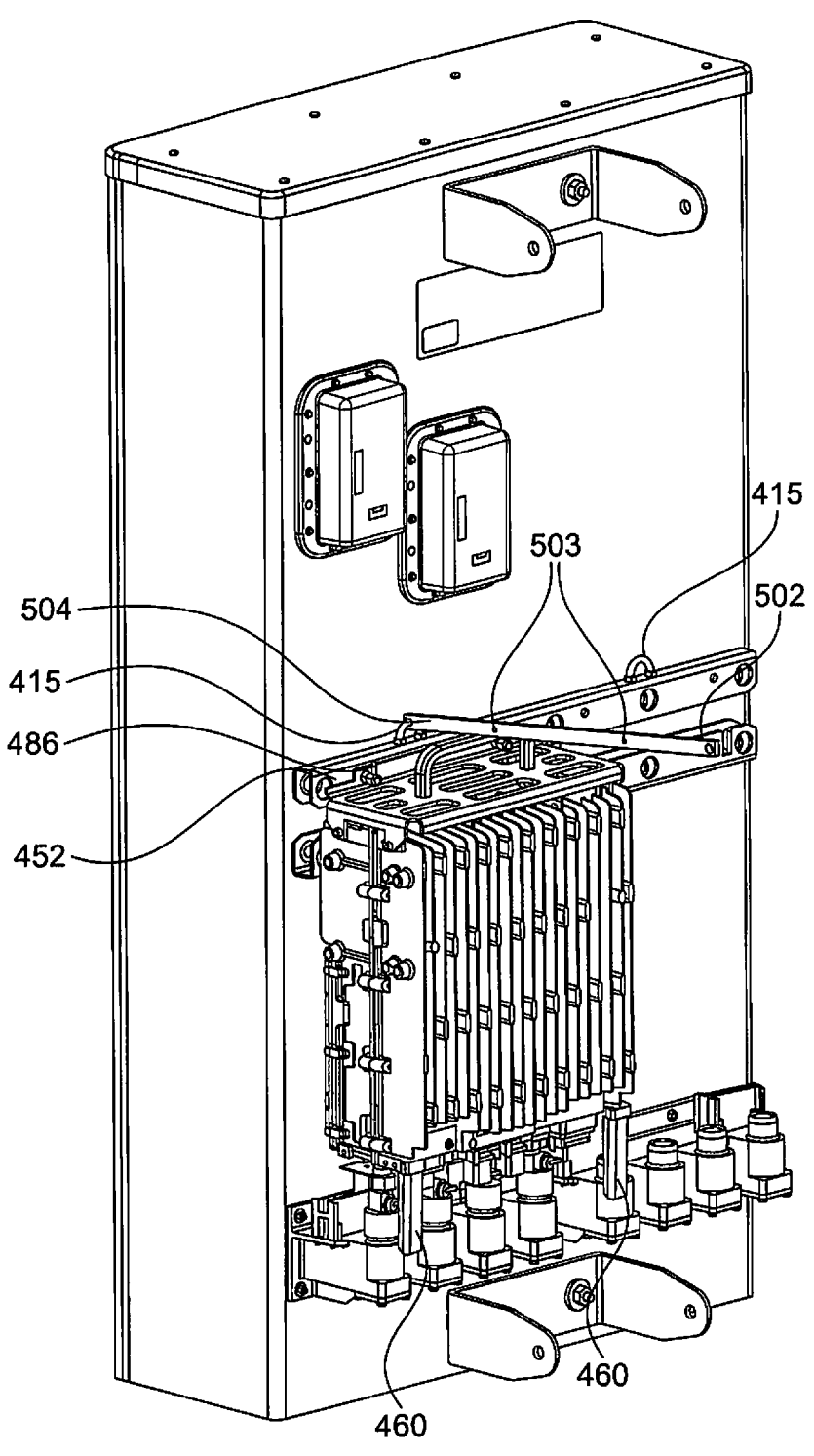

As illustrated in FIG. 14*f*, during the following installation step, the installer employs an installation lever 502 that includes a distal end 504 that is configured, as for example as a fork shape, to engage with pivot hook 415, allowing the installer to forcibly push down the remote radio head 402 as vertical plate 470 of T-shaped bracket 478 slides down the corresponding guide slots 432 and 430. Pivot hooks 415 are located behind projected width of handles 418, 416 respectively so as to allow the installation lever to rest over or under the handles as a fulcrum for exerting upward or downward force on the remote radio head.

Figure 14G:
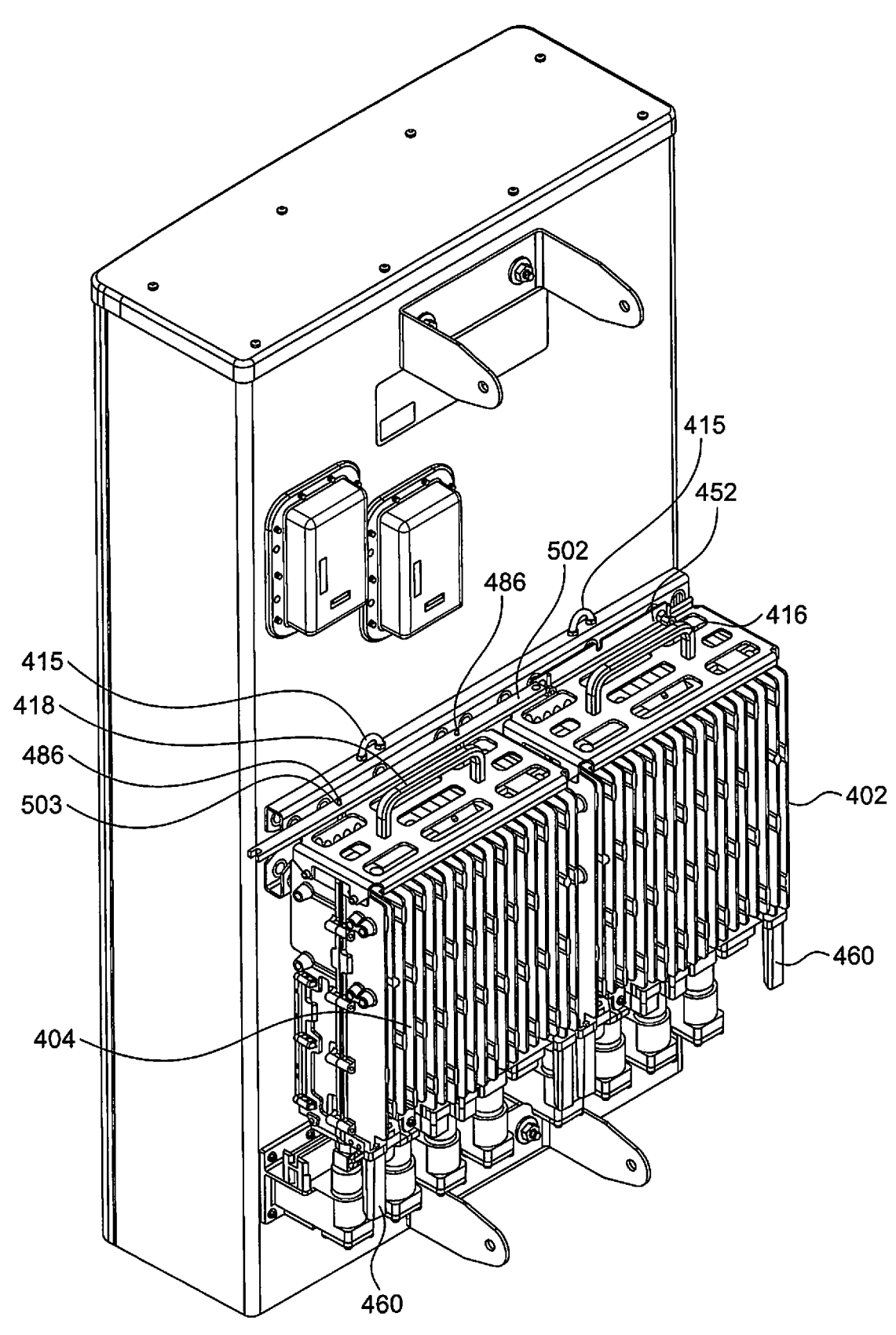

At this point, corresponding pins 482 of retractable plungers 456 are pushed into the corresponding holes 504 and the antenna module connectors are fully engaged with the connectors of remote radio heads 402 and 404 in a blind mate arrangement. FIG. 14*g* illustrates an arrangement where two remote radio heads 404 and 402 are installed on the back of a cellular antenna module. In accordance with one embodiment handles 486 of plunger 456 face vertically upward when the plunger is released in the unlock position, allowing lever 502 to securely rest on the remote radio head through holes 503 after the step of installing or uninstalling is completed.

Figure 14H:
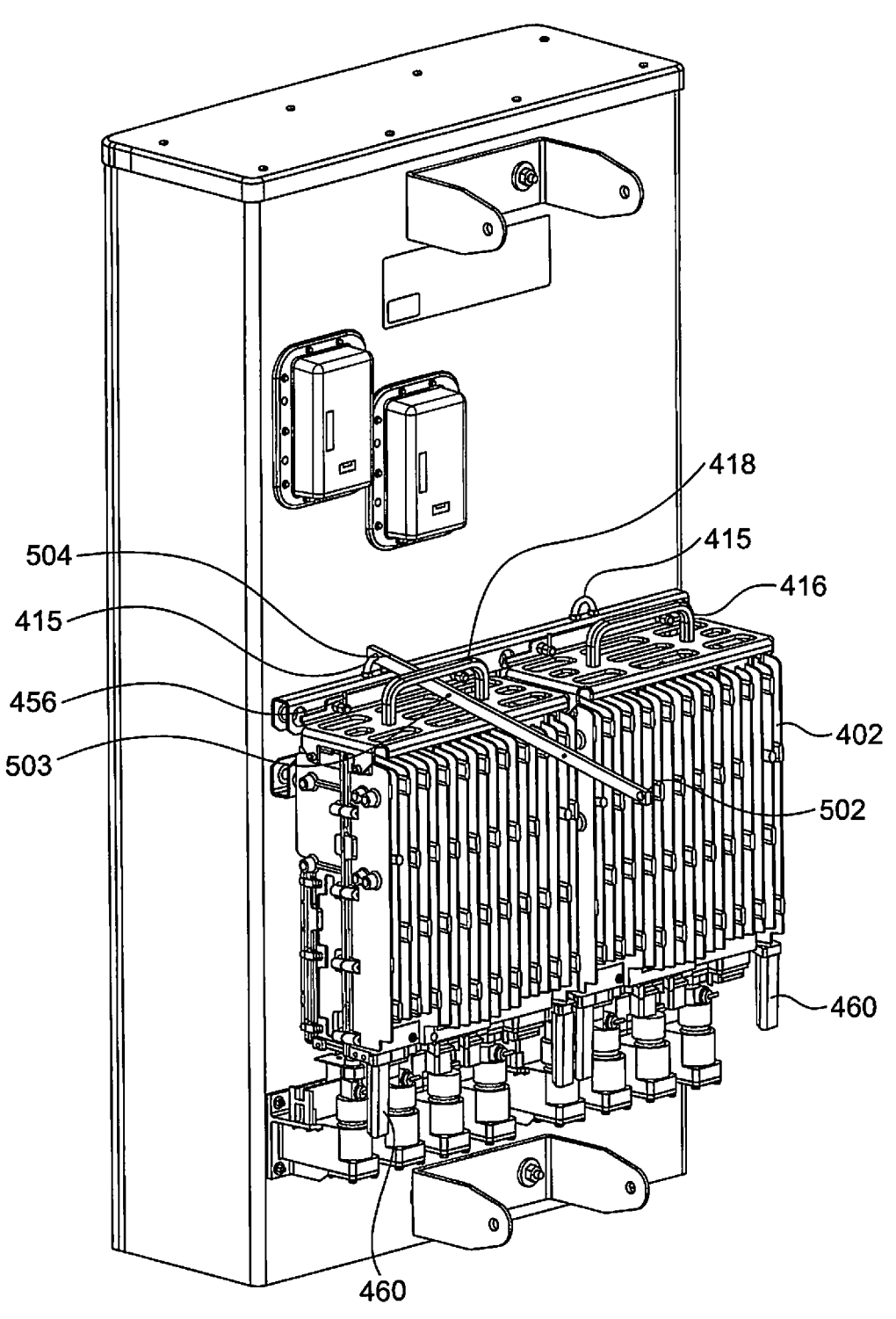
FIG. 14*h* illustrates the step of removing the radio head assembly.

FIG. 14*h* illustrates the step of uninstalling the remote radio head, wherein the installer first retracts pins 482 and locks them in a retracted position and then engages lever 502, this time by sliding the lever under handle 418 and engaging distal end 504 against pivot hook 415 and pushing the lever in an upward direction so that vertical plates 470 slide out of their corresponding guide slots. The installer then slides out the remote radio head from the mounting rail.

While only certain features of the invention have been illustrated and described herein, many modifications, substitutions, changes, or equivalents will now occur to those skilled in the art. It is therefore, to be understood that this application is intended to cover all such modifications and changes that fall within the true spirit of the invention.

The invention claimed is:

1. A remote radio head assembly configured to attach a remote radio head to the back wall of an antenna unit said remote radio head assembly comprising:

a handle coupled to the top of said remote radio head for handling said remote radio head, said handle attached to a mounting bracket, said mounting bracket having at least one radio guide spacer coupled to the back wall of said remote radio head;

a mounting rail module having an upper and lower guide rail attached to the back wall of said antenna unit and separated from each other at a distance for sliding said radio guide spacer along said mounting rail module; and a pivot hook fixedly disposed in relation to said back wall of said antenna unit configured to receive an installation lever that engages with said pivot hook and with said handle of said mounting bracket to push said remote radio head in an upward and downward direction.

2. The remote radio head assembly in accordance with claim 1, wherein said installation lever has a forked shaped distal end.

3. The remote radio head assembly in accordance with claim 2, wherein said handle is attached to a top plate of said mounting bracket, said mounting bracket being coupled to the top portion of said remote radio head.

4. The remote radio head assembly in accordance with claim 3, wherein said pivot hook is attached to the top side of said upper guide rail of said mounting rail module in a location along the projected width of said handle of said top plate of said mounting bracket so as to allow said handle to function as a fulcrum for said installation lever.

5. The remote radio head assembly in accordance with claim 4, wherein said mounting bracket further includes a retractable plunger configured to remain in a retracted position when said remote radio head slides along said mounting rail module, said retractable plunger is released when said remote radio head is positioned to be forced in a downward direction.

6. The remote radio head assembly in accordance with claim 5, wherein said plunger locks into a hole located on said mounting rail module when said remote radio head is pushed downwardly at its intended location.

7. The remote radio head assembly in accordance with claim 4, wherein said radio guide spacer includes a front and back plate configured to engage the front walls of said upper and lower guide rails of said rail mounting module in a sliding arrangement.

8. The remote radio head assembly in accordance with claim 7, wherein said radio guide spacer includes a T-shaped plate having a horizontal and vertical plates, said vertical plate having a width configured to engage said guide slots in a friction fit arrangement.

9. The remote radio head assembly in accordance with claim 8, wherein said vertical plate of said radio guide spacer is configured to slide in a corresponding guide slot upon exertion of a force sufficient to widen said guide slot allowing said vertical plate to pass through.

10. The remote radio head assembly in accordance with claim 9, further comprising remote radio head connector parts coupled to input/output terminals of said remote radio head.

11. The remote radio head assembly in accordance with claim 10, wherein said remote radio head connector parts are one of a male connector portion of a blind mate connector.

12. The remote radio head assembly in accordance with claim 11, wherein said remote radio head connector parts are aligned so as to engage with a female connector portion of said blind mate connector, said female connector portion coupled to input/output terminals of said antenna unit.

13. The remote radio head assembly in accordance with claim 12, wherein said blind mate connector fully engages upon said installation lever forcing said remote radio head downwardly along said guide rail.

14. The remote radio head assembly in accordance with claim 3, wherein said mounting rail module accommodates two remote radio heads each sliding from one end of said mounting rail module towards its center.

15. The remote radio head assembly in accordance with claim 3, wherein said lower guide rail of said mounting rail module includes a guide slot and said radio guide spacer includes a vertical plate that slides into said guide slot when said remote radio head is pushed downward.

16. The remote radio head assembly in accordance with claim 15, wherein said lower guide rail has at least two guide slots for receiving corresponding vertical plates of radio guide spacers.

* * * * *